US010359093B2

(12) United States Patent
Amaudric Du Chaffaut

(10) Patent No.: US 10,359,093 B2
(45) Date of Patent: Jul. 23, 2019

(54) SYSTEM FOR CONTROLLING THE MOVEMENT OF A LOAD

(71) Applicant: IFP Energies nouvelles, Rueil-Malmaison (FR)

(72) Inventor: Benoît Amaudric Du Chaffaut, Ecully (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 19 days.

(21) Appl. No.: 15/511,538

(22) PCT Filed: Jul. 27, 2015

(86) PCT No.: PCT/EP2015/067141
§ 371 (c)(1),
(2) Date: Mar. 15, 2017

(87) PCT Pub. No.: WO2016/041671
PCT Pub. Date: Mar. 24, 2016

(65) Prior Publication Data
US 2017/0254384 A1    Sep. 7, 2017

(30) Foreign Application Priority Data

Sep. 16, 2014  (FR) ...................................... 14 58698
Apr. 3, 2015   (FR) ...................................... 15 52883

(51) Int. Cl.
*E21B 19/09*     (2006.01)
*F16F 15/02*     (2006.01)
(Continued)

(52) U.S. Cl.
CPC ............ *F16F 15/022* (2013.01); *B60G 11/14* (2013.01); *B60G 17/00* (2013.01); *B63B 27/30* (2013.01);
(Continued)

(58) Field of Classification Search
CPC .... F16F 15/022; F16F 9/10; F16F 9/06; F16F 15/06; F16F 55/04; F16F 9/0209;
(Continued)

(56) References Cited

U.S. PATENT DOCUMENTS 2,264,070 A    11/1941  Davis
2,842,939 A *   7/1958  D Auriac .................. E02B 3/26
                                                    114/219
(Continued)

FOREIGN PATENT DOCUMENTS

FR    2025186 A1    9/1970
FR    2 193 775 A1  2/1974
FR    2575452 A1    7/1986

OTHER PUBLICATIONS

International Search Report for PCT/EP2015/067141 dated Oct. 23, 2015; English translation submitted herewith (8 pages).

*Primary Examiner* — Thomas W Irvin
(74) *Attorney, Agent, or Firm* — Fitch, Even, Tabin & Flannery LLP

(57) ABSTRACT

The invention is a system for controlling the relative movement of a load P, comprising at least one main damper having a longitudinal action of stroke C and two ends with one end being connected to a frame and the other being connected to the load. A compensation device is included having at least one secondary damper of longitudinal action with two ends with one end being secured to the frame and the other end is connected to the end of the main damper connected to the load The secondary damper is arranged so that, at one point of stroke C, the secondary damper has an action orthogonal in direction to the direction of the movement.

21 Claims, 17 Drawing Sheets

(51) Int. Cl.
*B66C 13/02* (2006.01)
*E21B 19/00* (2006.01)
*B60G 11/14* (2006.01)
*B60G 17/00* (2006.01)
*B63B 27/30* (2006.01)
*B66C 13/06* (2006.01)
*B66C 13/10* (2006.01)
*B66D 1/52* (2006.01)
*F16F 3/02* (2006.01)
*F16F 9/02* (2006.01)
*F16F 9/06* (2006.01)
*F16F 9/10* (2006.01)
*F16F 13/00* (2006.01)
*F16F 15/023* (2006.01)
*F16F 15/06* (2006.01)
*F16L 55/04* (2006.01)
*E21B 7/12* (2006.01)

(52) U.S. Cl.
CPC .............. *B66C 13/02* (2013.01); *B66C 13/06* (2013.01); *B66C 13/10* (2013.01); *B66D 1/52* (2013.01); *E21B 19/002* (2013.01); *E21B 19/006* (2013.01); *E21B 19/09* (2013.01); *F16F 3/02* (2013.01); *F16F 9/0209* (2013.01); *F16F 9/06* (2013.01); *F16F 9/10* (2013.01); *F16F 13/00* (2013.01); *F16F 15/023* (2013.01); *F16F 15/06* (2013.01); *F16L 55/04* (2013.01); *B60G 2204/421* (2013.01); *E21B 7/12* (2013.01)

(58) Field of Classification Search
CPC . F16F 15/023; F16F 13/00; F16F 3/02; B66D 1/52; B60G 17/00; B66C 13/06; B66C 13/10; B63B 27/30; E21B 7/12; E21B 19/006; E21B 19/09
USPC ........................................................ 188/266
See application file for complete search history.

(56) References Cited

U.S. PATENT DOCUMENTS

| | | | | |
|---|---|---|---|---|
| 3,549,129 A | * | 12/1970 | Graham | B63B 21/56 114/245 |
| 3,643,934 A | | 2/1972 | Bordes | |
| 3,788,074 A | * | 1/1974 | Castela | E21B 19/09 175/5 |
| 3,791,628 A | | 2/1974 | Burns et al. | |
| 3,881,695 A | * | 5/1975 | Joubert | E21B 19/09 166/355 |
| 3,948,486 A | * | 4/1976 | Jourdan | E21B 19/09 60/547.1 |
| 4,886,397 A | * | 12/1989 | Cherbonnier | E21B 19/09 405/195.1 |
| 5,160,219 A | * | 11/1992 | Arlt | E21B 19/006 166/350 |
| 5,520,369 A | | 5/1996 | Chatard | |
| 9,140,079 B2 | * | 9/2015 | Pohner | E21B 19/09 |
| 9,784,051 B2 | * | 10/2017 | Bergan | B63B 39/00 |

* cited by examiner

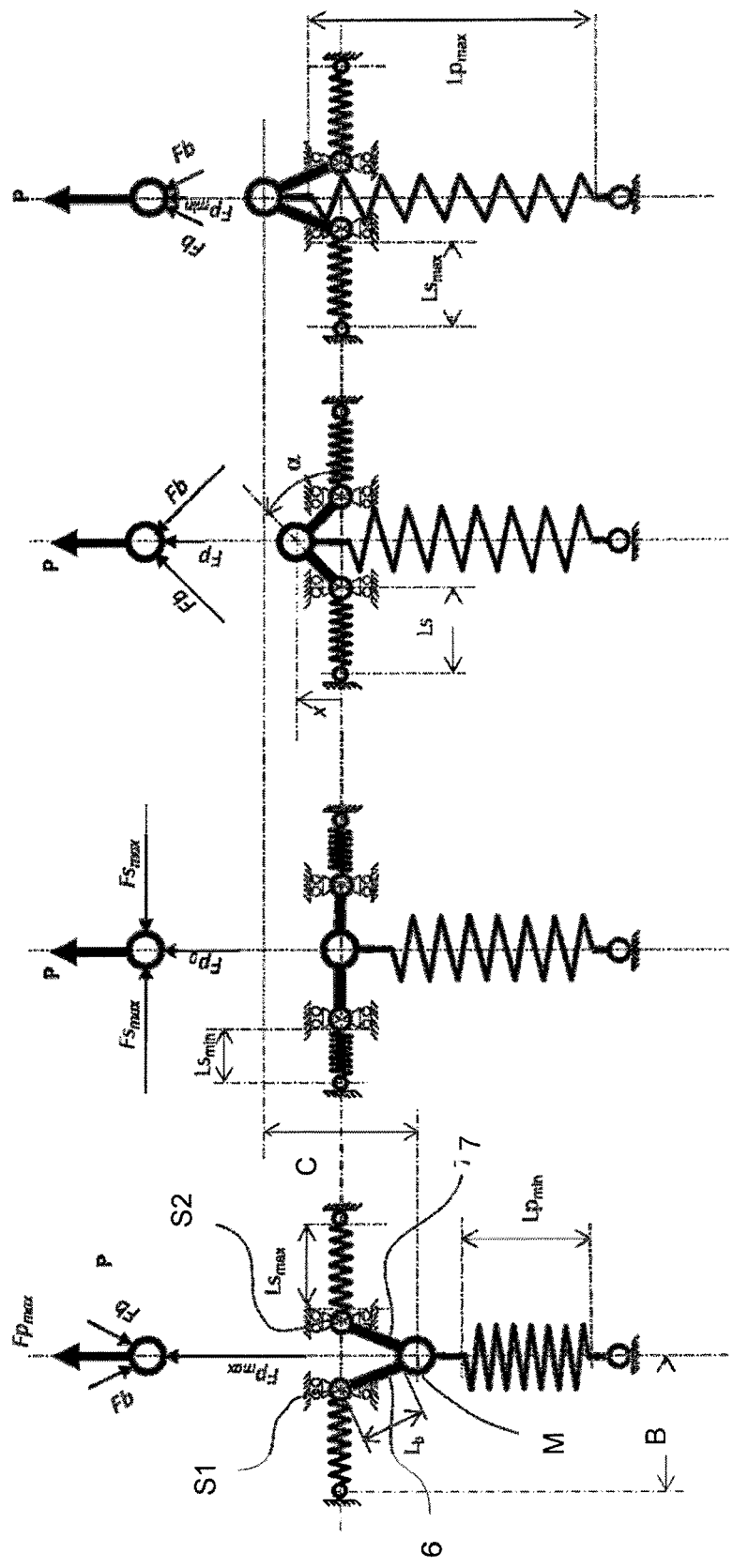

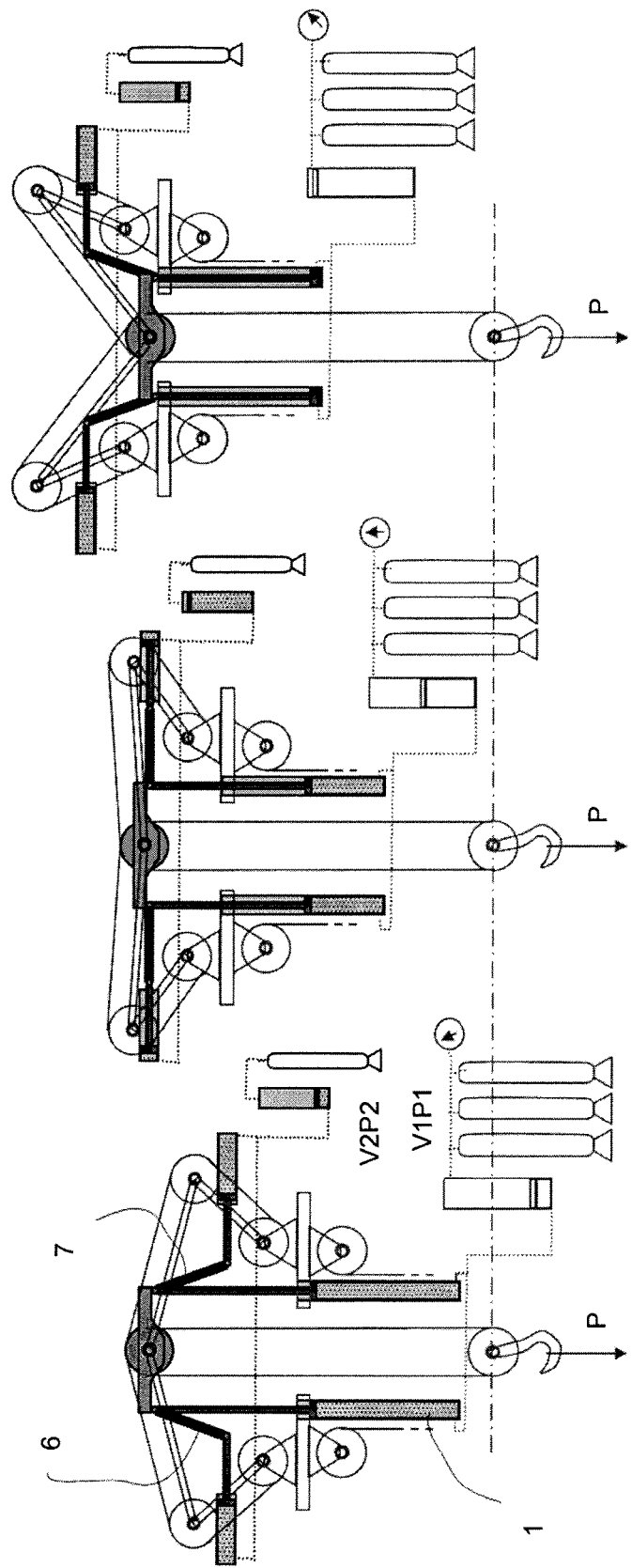

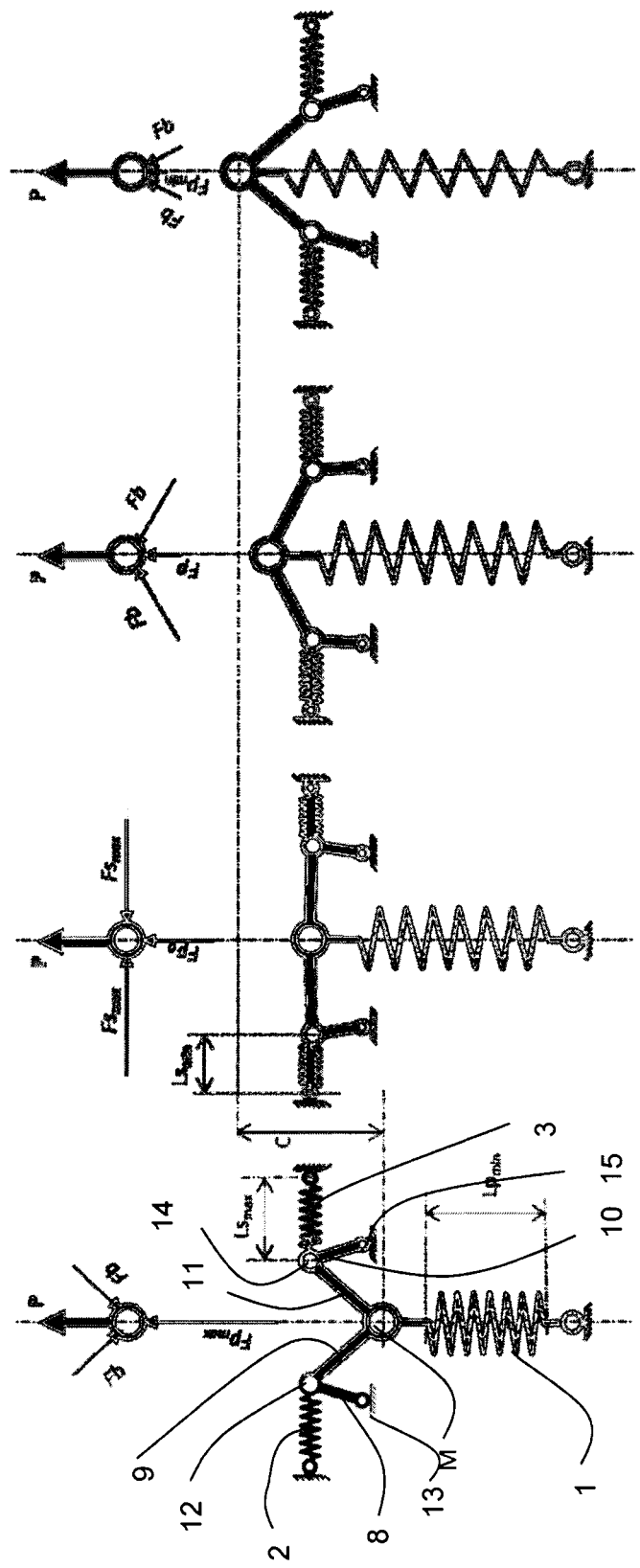

SYSTEM FOR CONTROLLING THE MOVEMENT OF A LOAD

CROSS REFERENCE TO RELATED APPLICATIONS

Reference is made to International Application No. PCT/EP2015/067141 filed Jul. 27, 2015 and French Patent Application Nos. 15/52.883 and 14/58.698, filed Apr. 3, 2015 and Sep. 16, 2014, respectively, which applications are incorporated herein by reference in their entirety.

BACKGROUND OF THE INVENTION

Field of the Invention

The present invention relates to the field of mechanical connections between two elements or sets of elements whose relative positions vary between limits determined by a connecting member and where it control is desired of the linking force between the two elements to involve independence of relative positions of the elements. In particular, the linking force is to be maintained substantially constant to permit application of the present invention in the field of lifting or of load damping.

Description of the Prior Art

The invention relates to a particular connection between two objects or mechanical assemblies with one being referred to as "support" and the other as "load". The purpose of the support is to limit the movement of the load when it is subjected to various stresses such as the own weight thereof. Connections usually encountered between a support and a load are either rigid or deformable. Deformable connections are mostly elastic, so that the linking force depends on the elongation of the connecting member which are then referred to as suspensions. For example, when a motor car (load) moves through the agency of its wheels (support) on uneven ground, the suspension, by deforming, allows the wheels to follow the ground irregularities without the car ride being too bumpy. However, the deformation of the shock absorbers causes a variation in the suspension force and the car, whose mass remains a priori unchanged, is therefore subjected to more or less comfortable vertical accelerations. These suspension force variations however remain essential due to the elastic return function they provide, which is a key function for suspensions where the load can vary significantly as a result of dynamic phenomena.

One area where suspension problems are somewhat different is that of floating marine units. Indeed, when the water depth is too great for the unit to be set on the sea bottom, the support, vessel or platform, is necessarily a floating support and it thus undergoes various uncontrollable motions, notably heave due to the wave motion. A load can simply hang from the float and accompany the movements thereof with the only suspension force variations then possibly resulting from the inertia thereof or the water resistance to the vertical movements thereof. The load can also be more or less linked to a fixed point at the bottom of the sea. The suspension force therefore needs to be as constant as possible regardless of whatever the position of the float, for fear of costly damages to the most fragile elements of the load. Two types of solution are then possible:

1. Either the operation is limited in time and the load is not too great. This is for example the case when laying a load of some tons on the sea bottom from a vessel undergoing heavy swell. The most effective solution is dynamic control of the lifting system that supplies or dissipates the energy required to maintain the load substantially stationary when the support moves. This is then referred to as "active compensation", and the load movement tolerance performances can be in the order of centimeters when the support movements are in the order of meters;

2. Or the load is very high, permanent or with too long an operation time. The cost of the energy required for active compensation then becomes prohibitive. This is the case with vertical pipes (risers) connecting a subsea wellhead to a floating platform for a period of 10 to 20 years, or with a drill string partly laid on the bottom of a well being drilled by a drill ship for several days or weeks. The conventional solution known as "passive compensation" consists in hydropneumatic cylinders, in other words air springs. These systems do not consume energy; they enable large vertical movements (several meters); they have nearly linear characteristics (force-elongation curves); and they allow a large variety of situations depending on the volumes and the pressure of the air tanks. The performances are measured in variation of the suspension force as a function of movement and they greatly depend on the amounts of air under high pressure available. Thus, to compensate for a drill string of the order of 300 tons while drilling on a vessel subjected to waves of 7 to 8 meters in amplitude (25 ft), in order to limit the variation of the weight on bit to more or less 2% of the total suspended weight approximately 6 tons it is necessary to have a reserve of air at 200 bars of over 40 m$^3$.

An improved passive compensation system intended for offshore drilling operations is described in document U.S. Pat. No. 5,520,369 corresponding to French Patent 2,575, 452 where the required volume of air mentioned in the above example has been reduced by about half through the implementation of a particular geometry of the lifting system cableway supplementing the effort of the hydropneumatic cylinders.

In practice, vessels and platforms assigned to underwater work are very often equipped with both systems, and they use them in a supplementary and simultaneous manner if need be. However, the limited capacities and the operating costs of the active systems seek more performance and precision for the passive systems.

SUMMARY OF THE INVENTION

The present invention further improves tpassive compensation and possibly extends its field of application.

The present invention thus relates to a system for controlling the relative movement of a load P, comprising at least one main damper of longitudinal action of stroke C having two ends with one end being connected to a frame and the other end being connected to the load and comprises a compensation device is includes as at least one secondary damper of longitudinal action which has two ends with one end being secured to the frame and the other end being connected to the end of the main damper connected to the load The secondary damper is arranged in such a way that, at one point of stroke C, the secondary damper has an action in an orthogonal direction to the direction of the movement.

The damper of longitudinal action can be one of a spring cylinder, a hydraulic cylinder or a pneumatic cylinder type, or a combination thereof.

Stroke C can correspond at most to the length of the rod of the cylinder.

At least two secondary dampers can be arranged symmetrically with respect to the axis of the main damper, so that the actions thereof cancel each other out when they are orthogonal to the axis of movement.

The orthogonality point can be substantially in the middle of stroke C.

One of the ends of the secondary damper of longitudinal action can be connected to the end of the main damper connected to the load by an articulated system.

Advantageously, the articulated system comprises a connecting rod.

According to an embodiment, the articulated system comprises a first connecting rod having one end fastened to the end of the main damper which is connected to the load, and a second connecting rod comprising a first articulated end with respect to a second end of the first connecting rod and a second articulated end with respect to the frame. The articulation between the first connecting rod and the second connecting rod is fastened to the end of the secondary damper connected to the main damper.

Alternatively, the articulated system comprises a first connecting rod whose one end is fastened to the end of the main damper connected to the load, and a second connecting rod comprising a first articulated end with respect to a second end of the first connecting rod, an articulation with respect to the frame and a second end fastened to the end of the secondary damper connected to the main damper.

The longitudinal movement of the secondary damper may be in a fixed direction in relation to the direction of movement of the main damper.

The invention also relates to a floating support heave compensator comprising a load movement control system according to the above description.

In the compensator, the main damper can have at least two steering cylinders substantially parallel to the direction of the load.

The main and secondary damper can be hydraulic cylinders.

The main and secondary damper can comprise independent hydropneumatic systems for adjusting their hydraulic pressure independently.

BRIEF DESCRIPTION OF THE FIGURES

Other features and advantages of the present invention will be clear from reading the description hereafter of embodiments given by way of non limitative example, with reference to the accompanying figures wherein:

FIGS. 11a, 11b and 11c schematically show the application of a hydropneumatic isodyne compensator to a lifting system on a floating support;

FIGS. 12a, 12b, 12c and 12d schematically show a so-called "isodyne" compensator with an articulated system comprising two connecting rods;

DETAILED DESCRIPTION OF THE INVENTION

According to the invention, the force produced by an elastic spring is substantially proportional to its deformation (deflection). It therefore varies more or less linearly between two extreme values (minimum and maximum). The constant value sought (setpoint) lies between these extremes, in the middle for example. In order to maintain the same setpoint value throughout the stroke (maximum–minimum), it is necessary to add to or to subtract from the force of the main spring a complementary force, substantially proportional to the deviation of the deflection from the position corresponding to the setpoint force, here at the midpoint for example.

Figure 1A:
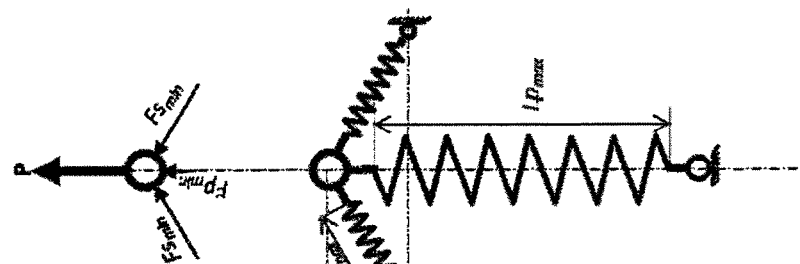
FIG. 1a-d schematically show a compensator known as "isodyne" with combined T-shaped compression springs, FIG. 2a-d schematically show an "isodyne" compensator with combined springs and connecting rods.
Figure 1B:
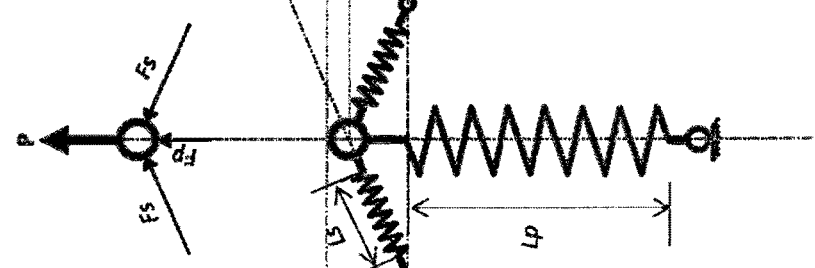

A first solution provided by the present invention arranges one or more lateral springs with axes concurrent to one end of the main spring and perpendicular to the axis of this main spring for the setpoint value. The principle of such a compensation can be better understood with the example described in FIG. 1. The four diagrams 1a, 1b, 1c and 1d show the device in four positions of moving point M. FIG. 1b is referred to as the setpoint figure, where no resultant force from the lateral auxiliary or secondary springs acts upon point M. The main spring exerts force $Fp_0$. In the rest of the description and for all the embodiments described, the term "spring" designates a damper that can take the form of a spring cylinder, a hydraulic cylinder, a pneumatic cylinder or a similar system, or a combination of such cylinders.

Figure 1C:
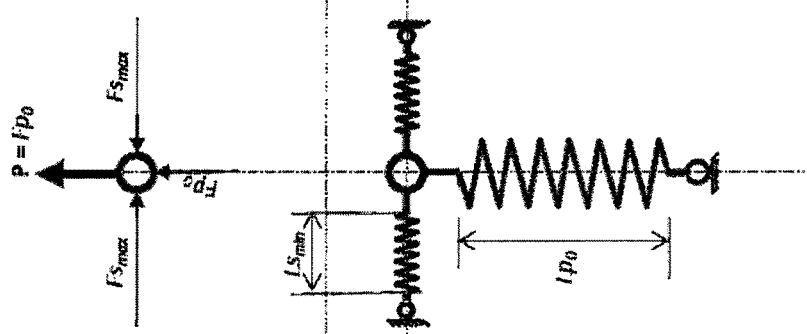
Figure 1D:
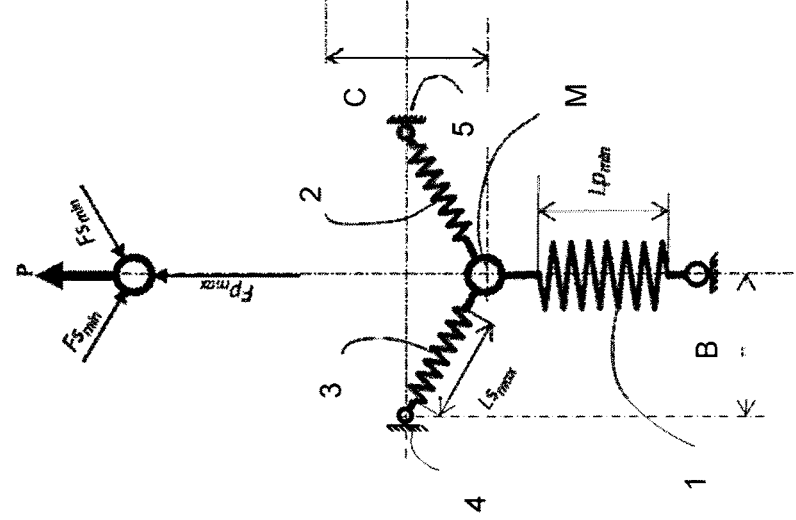

Main compression spring 1 provides force $Fp_{max}$ when it is compressed to its minimum length $Lp_{min}$ (FIG. 1a), and force $Fp_{min}$ when it is expanded to its maximum length $Lp_{max}$ (FIG. 1d). Halfway through stroke C, the value of the force is setpoint value $Fp_0$ (FIG. 1b). FIG. 1c illustrates the operation at any point of the stroke, indicated by value x, and this force is evaluated by the formula:

$$F_p = F_{p0} - K_p x$$

where $K_p$ is the stiffness of the main spring.

Two identical compression springs 2 and 3 referred to as secondary, are arranged symmetrically on either side of the main spring axis. They have a common mobile end articulated on mobile end M of main spring 1, and their fixed ends 4 and 5 are articulated on the same bearing structure as that of the main spring. These springs are aligned along an axis perpendicular to that of the main spring halfway through the stroke thereof (FIG. 1b), at a distance B. For all the other positions, the vertical component of the resultant of their forces adds up to the force of the main spring for the upper half of the stroke and is deducted therefrom for the lower half. With notations similar to those of the main spring, it can then be written:

$$F_s = F_{smax} - K_s(L_s - L_{smin}),$$

with: $L_s - L_{smin} = \sqrt{B^2 + x^2} - B$.

The resultant force P, or lift of the system, is written as follows:

$$P = F_p + 2F_s \sin \alpha$$

with:

$$\sin \alpha = \frac{x}{\sqrt{B^2 + x^2}};$$

i.e. finally:

$$P = F_{p0} - K_p x + \frac{2x}{\sqrt{x^2 + B^2}}\left[F_{max} - K_2\left(\sqrt{B^2 + x^2} - B\right)\right].$$

The <<isodyne>> compensation (i.e. at constant force) then amounts to selecting the quantities and parameters allowing, if not to satisfy the following equation, at least to minimize the first term thereof over the largest possible part of the stroke.

$$\frac{2x}{\sqrt{x^2 + B^2}}\left[F_{max} - K_2\left(\sqrt{B^2 + x^2} - B\right)\right] - K_p x = 0$$

In practice, the characteristics of the springs are imposed. It however remains possible to add extensions or connections of adjustable lengths thereto, or to combine them in series or in parallel. Variable x is limited by the stroke of the main spring, and quantity B is determinant for the inclination of the secondary springs.

A method of determining the parameter set can be optimization using a computer model allowing exploring a large number of combinations while rapidly viewing the results.

Without departing from the scope of the present invention, the number or the arrangements of the secondary springs can be changed, for example by taking up the horizontal component of their force through a mechanical guidance.

A second solution, mechanically quite close, inserts articulated connecting rods between moving end M of the main spring and those of secondary springs S1 and S2 (FIG. 2a). It is then necessary, for the balance of forces, to take up the forces of the connecting rod small ends through a suitable guidance, perpendicular to the main spring axis. FIGS. 2a-d illustrate this solution where the secondary or auxiliary springs do not tilt with respect to the orthogonal to the main spring axis, but always compress and expand along the same axis through the action of connecting rods 6, 7 of length $L_b$, and suitable guidance.

The forces of the springs can be written as follows:

$$F_p = F_{p0} - K_p x$$

$$F_s = F_{smax} - K_s(L_s - L_{min})$$

with:

$$L_s - L_{smin_s} = L_b - \sqrt{L_b^2 - x^2}$$

The balance of a connecting rod implies that the horizontal $Fb_h$, and vertical $Fb_v$ components of its compression Fb are related by:

$$F_{bv} = F_{bh} tg\alpha$$

with Lb the length of the connecting rod:

$$tg\alpha = \frac{x}{\sqrt{L_b^2 - x^2}}$$

and at any point of the stroke:

$$F_{bh} = F_s$$

and:

$$p = F_p + 2F_{bv}$$

The expression for lift P is then written as follows:

$$P = F_{p0} - K_p x + \frac{2x}{\sqrt{L_b^2 - x^2}}\left[F_{smax} - K_2\left(L_b - \sqrt{L_b^2 - x^2}\right)\right]$$

The "isodyne" compensation amounts to satisfying the equation:

$$\frac{2x}{\sqrt{L_b^2 - x^2}}\left[F_{smax} - K_s\left(L_b - \sqrt{L_b^2 - x^2}\right)\right] - K_p x = 0$$

over the largest possible part of the stroke.

For x non-zero, the latter equation can be simplified to:

$$K_s - \frac{K_p}{2} + \frac{F_{smax} - K_s L_b}{\sqrt{L_b^2 - x^2}} = 0$$

It thus appears that there is at least one "perfect" compensation solution, at least in the static domain: it is any set of quantities and parameters such as:

$$K_s = \frac{K_p}{2} \text{ and } L_b = \frac{F_{smax}}{K_s}$$

that will provide a theoretically ideal isodyne compensation over the entire stroke.

In this implementation, the number or the arrangement of the secondary springs can be changed without departing from the scope of the invention, for example by replacing two antagonistic compression springs with a tension spring positioned between the two connecting rod small ends and producing the same forces.

A third solution, mechanically rather close to the second solution, inserts an articulated system between moving end M of the main spring and those of secondary springs S1 and S2 (FIG. 12a). According to the embodiment illustrated in FIG. 12a to 12d, each articulated system comprises two connecting rods 8 and 9, and 10 and 11 respectively, articulated with respect to one another. First connecting rod 9 (or 11 respectively) comprises one end fastened to the end of main spring 1 connected to the load and a second articulated end with respect to a first end of second rod 8 (or 10). Second connecting rod 8 (or 10) comprises an articulated end with respect to the second end of the first rod, and a second articulated end 13 (or 15) with respect to the frame. The end of secondary spring 2 (or 3) linked to the main spring is fastened to articulation 12 (or 14) between first connecting rod 9 (or 11) and second rod 8 (or 10). The main 1 and secondary 2 springs of this solution are arranged and mounted with respect to the frame identically to their arrangement and assembly in the first and second solutions. FIGS. 12a-d illustrate this solution where the secondary or auxiliary springs do not tilt with respect to the orthogonal to the main spring axis, but they always compress and expand along the same axis through the action of connecting rods 8, 9, 10 and 11 of length $L_b$, and suitable guidance.

For this third solution, the articulated connecting rod system is lighter and easier to build. The trajectories of the rod small ends are arcs of a circle and the points of application of the forces exerted by the secondary springs can be moved or used as levers to reduce the size or lower the center of gravity of the assembly.

In this implementation, the number or the arrangement of the secondary springs can be changed without departing from the scope of the invention, for example by replacing two antagonistic compression springs with a tension spring positioned between the two connecting rod small ends and producing the same forces.

Figures 13A, 13B, 13C, 13D:
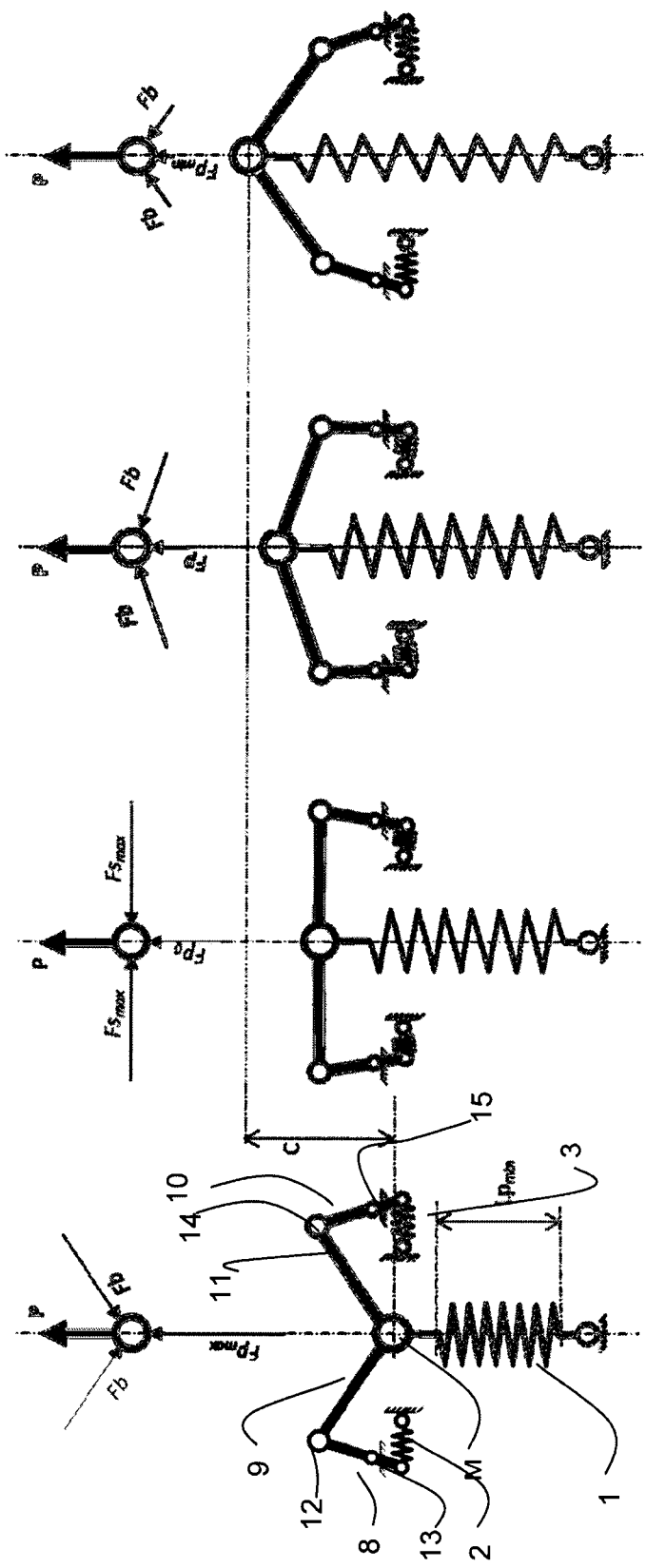
FIGS. 13a, 13b, 13c and 13d schematically show a variant embodiment of the so-called "isodyne" compensator with an articulated system comprising two connecting rods.

A fourth solution, mechanically rather close to the third solution, inserts an articulated system between moving end M of the main spring and those of secondary springs S1 and S2 (FIG. 13a). According to the embodiment illustrated in FIG. 13a to 13d, each articulated system comprises two connecting rods 8 and 9, and 10 and 11 respectively, articulated with respect to one another. First connecting rod 9 (or 11 respectively) comprises one end fastened to the end of main spring 1 connected to the load and a second articulated end with respect to a first end of second rod 8 (or 10). Second connecting rod 8 (or 10) comprises an articulated end with respect to the second end of the first rod, an articulation 13 (or 15) with respect to the frame, and a second end fastened to secondary spring 2 (or 3). Articulation 13 (or 15) does not correspond to an end of rod 8 (or 10) and it is positioned between the two ends. The main 1 and secondary 2 springs of this solution are arranged and mounted with respect to the frame identically to their arrangement and assembly in the first and second solutions. FIGS. 13a-d illustrate this solution where the secondary (or auxiliary) springs do not tilt with respect to the orthogonal to the main spring axis, but they always compress and expand along the same axis through the action of connecting rods 8, 9, 10 and 11 of length $L_b$, and suitable guidance.

For this fourth solution, the articulated connecting rod system is lighter and easier to build. The trajectories of the rod small ends are arcs of a circle and the points of application of the forces exerted by the secondary springs can be moved or used as levers to reduce the size or lower the center of gravity of the assembly.

In this implementation, the number or the arrangement of the secondary springs can be changed without departing from the scope of the invention, for example by replacing two antagonistic compression springs with a tension spring positioned between the two connecting rod small ends and producing the same forces. For example, it is possible to connect two symmetrical connecting rod small ends with a transverse tension spring producing the desired compressions in first connecting rods 9 and 11. The ends of such a tension spring can be anywhere on the first and second rods, provided that they are symmetrical with respect to a vertical axis. According to another example, the secondary compression springs can be replaced with a single spring linking the second ends of the second rods. According to another variant embodiment, the linear secondary springs can be replaced with tension or flexion springs or bars controlling the rotation of the rods about the articulations around the frame.

Figure 14:
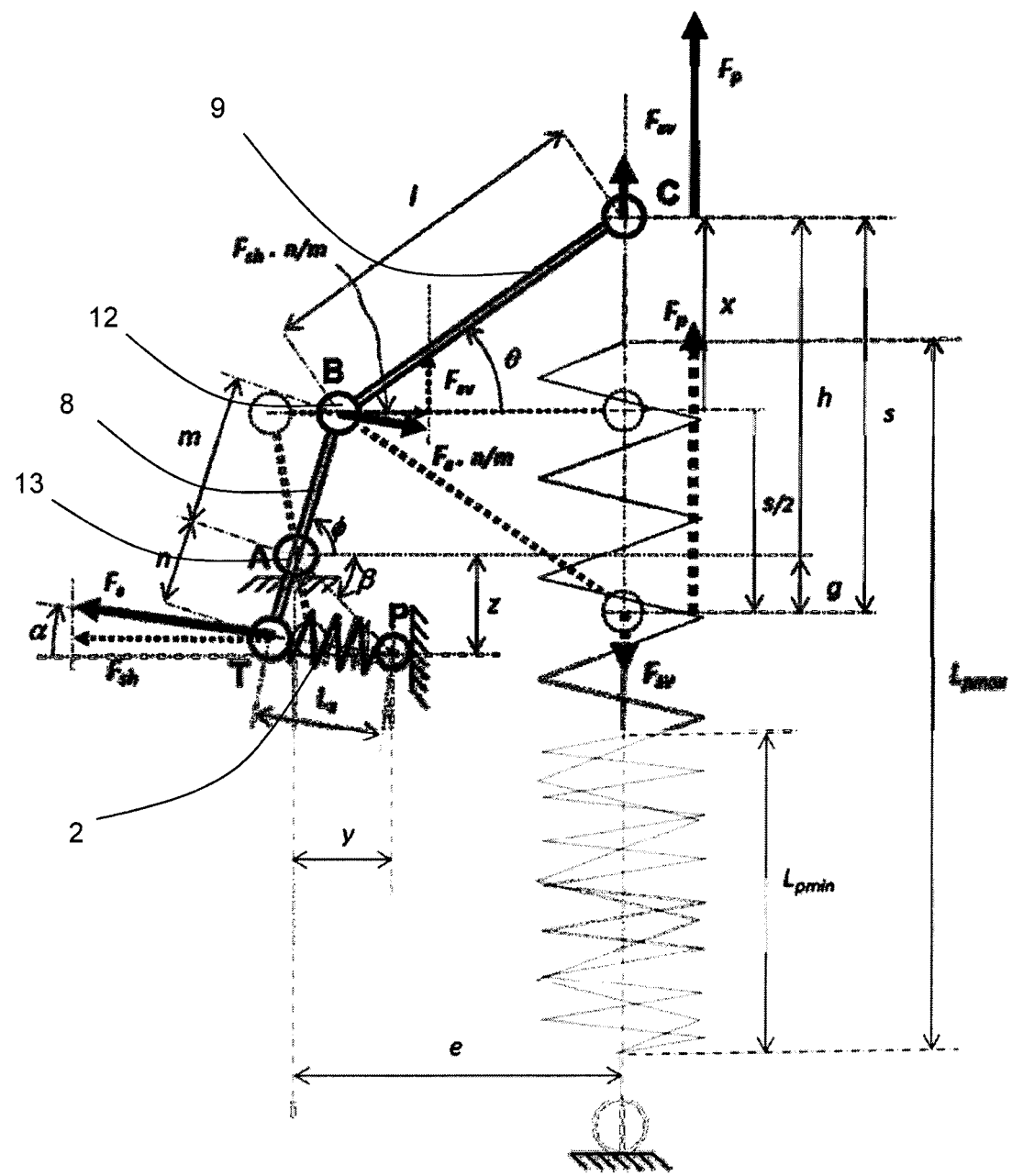
FIG. 14 illustrates a geometric parametrization of an articulated system comprising two connecting rods.

For the third and fourth solutions, calculation of the forces is carried out as for the first two solutions and according to the geometric parametrization of FIG. 14. FIG. 14 corresponds to the solution of FIGS. 13a-13d. The force of the main spring is expressed as: $F_p = F_{p0} - K_p x$, where $F_{p0}$ is the nominal force at midway point, and $K_p$ is the stiffness.

The horizontal component $F_{sh}$ of force $F_s$ produced by the secondary spring at point B provides, at articulation point 12 or 14 of the two connecting rods, an opposing horizontal force of intensity $$F_{sh} * \frac{n}{m}$$

with n being the length between the articulations of second rod 8 or 10 with the frame and the secondary spring, and m being the length between the articulations of second rod 8 or 10 with the frame and first rod 9 or 11. The main spring end connected to the load is limited to a vertical line with this force inducing a compression of the rod BC. Depending on the position of point C and therefore depending on the inclination of rod BC to the horizontal, the complementary force is directed upwards or downwards, or it is zero when rod BC is horizontal.

Calculation of the complementary force for each position of C is based on the solution of triangles ABC and APT respectively, by use of the generalized Pythagorean theorem, or law of cosines, providing the values of angles $\varphi$, $\alpha$ and $\theta$, as well as length PT allowing force $F_s$ to be known.

If first put is:

$$h = \frac{s}{2} - g + x \text{ and } AC^2 = h^2 + e^2,$$

the following equations can be written:

$$\varphi = \arccos\left(\frac{AC^2 + m^2 - l^2}{2 \cdot AC \cdot m}\right) + \arctg\left(\frac{h}{e}\right)$$

$$\theta = \arcsin\left(\frac{h - m\sin\varphi}{l}\right)$$

$$PT^2 = n^2 + AP^2 - 2 \cdot n \cdot AP \cdot \cos(\pi - \varphi - \beta) \text{ with}$$

-continued $$\beta = \operatorname{arc}tg\left(\frac{z}{y}\right)$$

$$\alpha = \beta - \arccos\left(\frac{AP^2 + PT^2 - AT^2}{2 \cdot AP \cdot PT}\right)$$

and eventually:

$$F_s = F_{smax} - K_s(PT - PT_{min})$$

where:
- $F_{smax}$ is the maximum compression of the secondary spring, corresponding to the minimum $PT_{min}$ of length PT, when connecting rod BC is horizontal,
- $K_s$ is the stiffness of the secondary spring.

The vertical complementary force thus is:

$$F = F_s \cdot \frac{n}{m} \cdot \cos\alpha \cdot tg\theta$$

Finally, the total lift of the system is obtained by adding the force of the main spring to the calculated complementary force expressed as:

$$P = F_p + F_{sv}$$

EXAMPLES

1: Compensator with 3 T-shaped springs:

By arranging commercially available springs according to the layout of FIGS. 1a-d, it is possible to model the behaviour of the device. The (compression) springs selected for this example have the following characteristics:

| Main spring Medium spring Olma T2 56 90 500 | | | | | |
|---|---|---|---|---|---|
| | Load daN | | Deflection mm | | Length mm |
| | 1000 | | 250 | Lj | 250 |
| Pc | 800 | Fc | 200 | Lc | 300 |
| Pb | 630 | Fb | 160 | Lb | 340 |
| Pa | 500 | Fa | 125 | La | 375 |
| | 0 | | 0 | L0 | 500 |

| Lateral springs Light spring Olma T2bis 56 84 400 | | | | | |
|---|---|---|---|---|---|
| | Load daN | | Deflection mm | | Length mm |
| | 560 | | 240 | Lj | 160 |
| Pc | 450 | Fc | 190 | Lc | 210 |
| Pb | 360 | Fb | 150 | Lb | 250 |
| Pa | 280 | Fa | 120 | La | 280 |
| | 0 | | 0 | L0 | 400 |

Indices a, b and c characterize the values at 50%, 63% and 80% respectively of the stroke of each spring. Distance B in FIG. 1a is the sum of minimum length $L_{smin}$ of a secondary spring and of a value E representing the rod ends and bearings (here 177 and 76 mm respectively, i.e. 253 mm for B).

Figure 3:
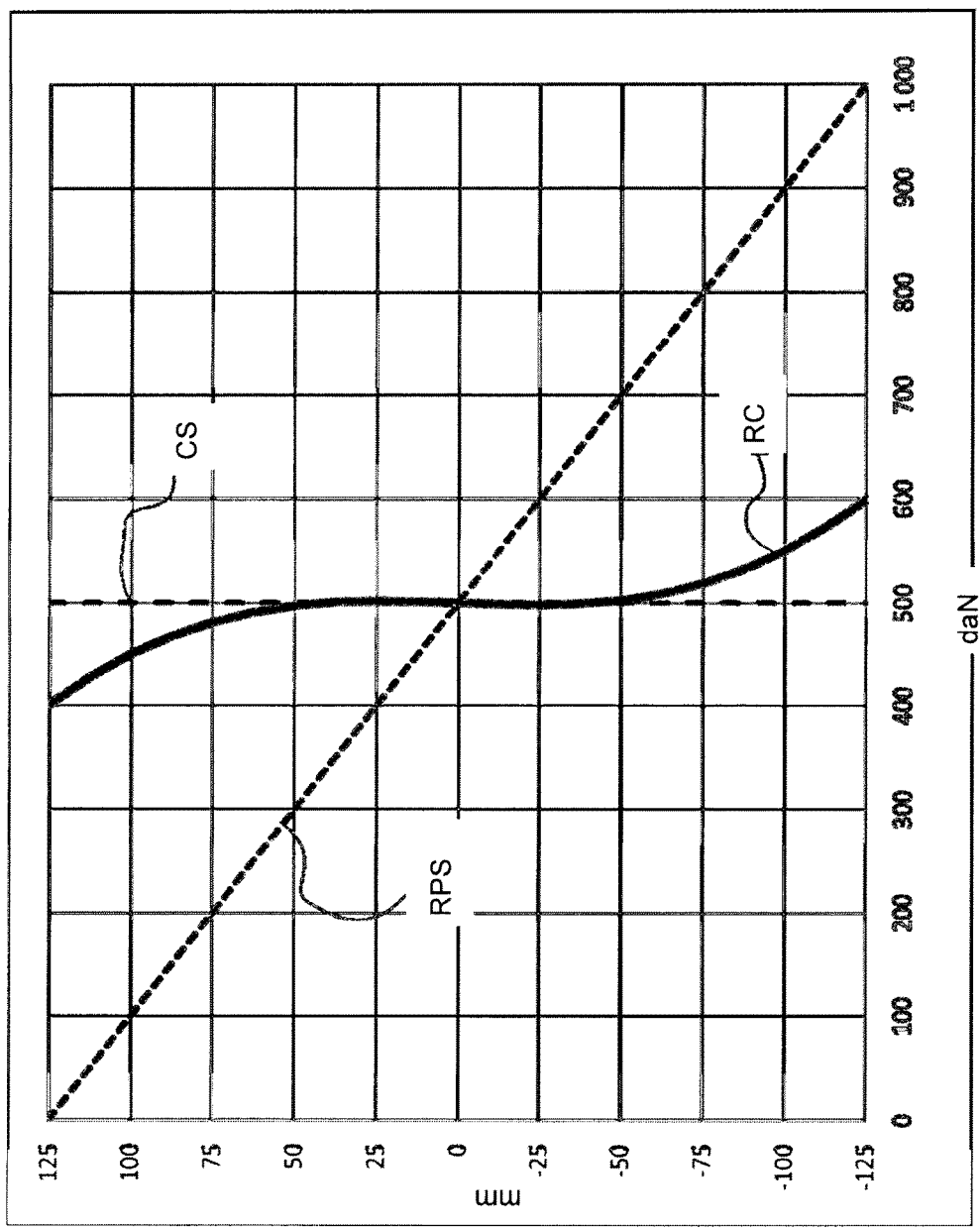
FIG. 3 shows an example of response of an isodyne compensator with 3 T-shaped springs.

For a nominal load ($Fp_0$, setpoint) on the main spring of 500 daN, corresponding to half the deflection thereof, the diagram of FIG. 3 shows the behaviour of the device. Curve CS shows the setpoint, curve RPS is the response with a single main spring and curve RC is the response with the compensation according to FIGS. 1a-d. Over a wide central range of stroke C, of approximately 100 mm, lift F is nearly constant at about 500 daN. At the ends of the stroke, the system shows a small stiffness providing a minimum elastic return of about 100 daN. An application is for anti-vibration or even for an anti-seismic filter.

Figure 4:
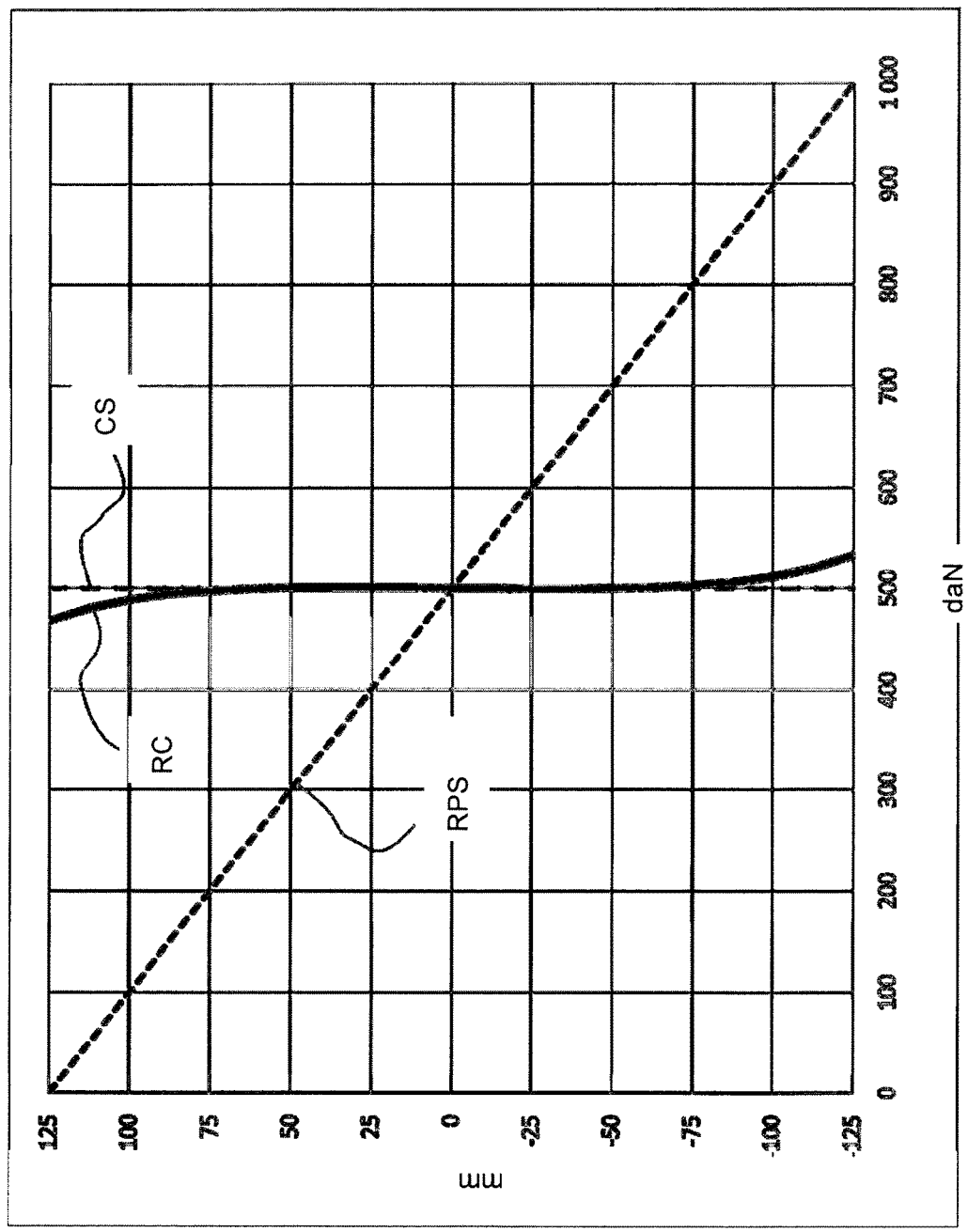
FIG. 4 shows an example of response of an isodyne compensator with springs and connecting rods.

2: Compensator with springs and connecting rods (FIGS. 2a-d):

Using the same main spring as in the above example and lighter lateral springs associated with 176 mm-long articulated connecting rods according to the configuration of FIGS. 2a-d, the following behaviour is obtained:

| Lateral springs Light spring Olma T2bis 45 68 250 | | | | | |
|---|---|---|---|---|---|
| | Load daN | | Deflection mm | | Length mm |
| | 355 | | 150 | Lj | 100 |
| Pc | 280 | Fc | 120 | Lc | 130 |
| Pb | 225 | Fb | 96 | Lb | 154 |
| Pa | 180 | Fa | 76 | La | 174 |
| | 0 | | 0 | L0 | 250 | where an improved effect can be observed in FIG. 4 since the stroke at constant load F of 500 daN has increased from 100 (FIG. 3) to 150 mm.

On the other hand, the "ideal" compensation is more difficult to obtain only from the catalogue characteristics. With "custom-made" springs, it will be possible to come closer thereto more easily, provided in particular that the stiffness values remain constant throughout the stroke and that they do not change over time.

3: Compensator with pneumatic or hydropneumatic cylinders (FIGS. 5a-c):

The drawback of catalogue or even custom springs is limited to a single and rather narrow loading range. On the other hand, pneumatic or hydropneumatic cylinders can advantageously adapt to a load through simple pressure adjustment and obtain a stiffness by varying the ratio of the volume variation in the cylinder to the total volume of gas to which the system is connected. Since it is generally compressed air, which is not quite a perfect gas, the formula generally admitted for relating pressure P to volume V is:

$$P \cdot V^\gamma = \text{Constant}$$

with the air: $\gamma = 1.4$.

The response of a pneumatic cylinder can therefore not be linear like that of a helical spring. Its "stiffness" varies slightly along the stroke.

Figures 5A, 5B, 5C:
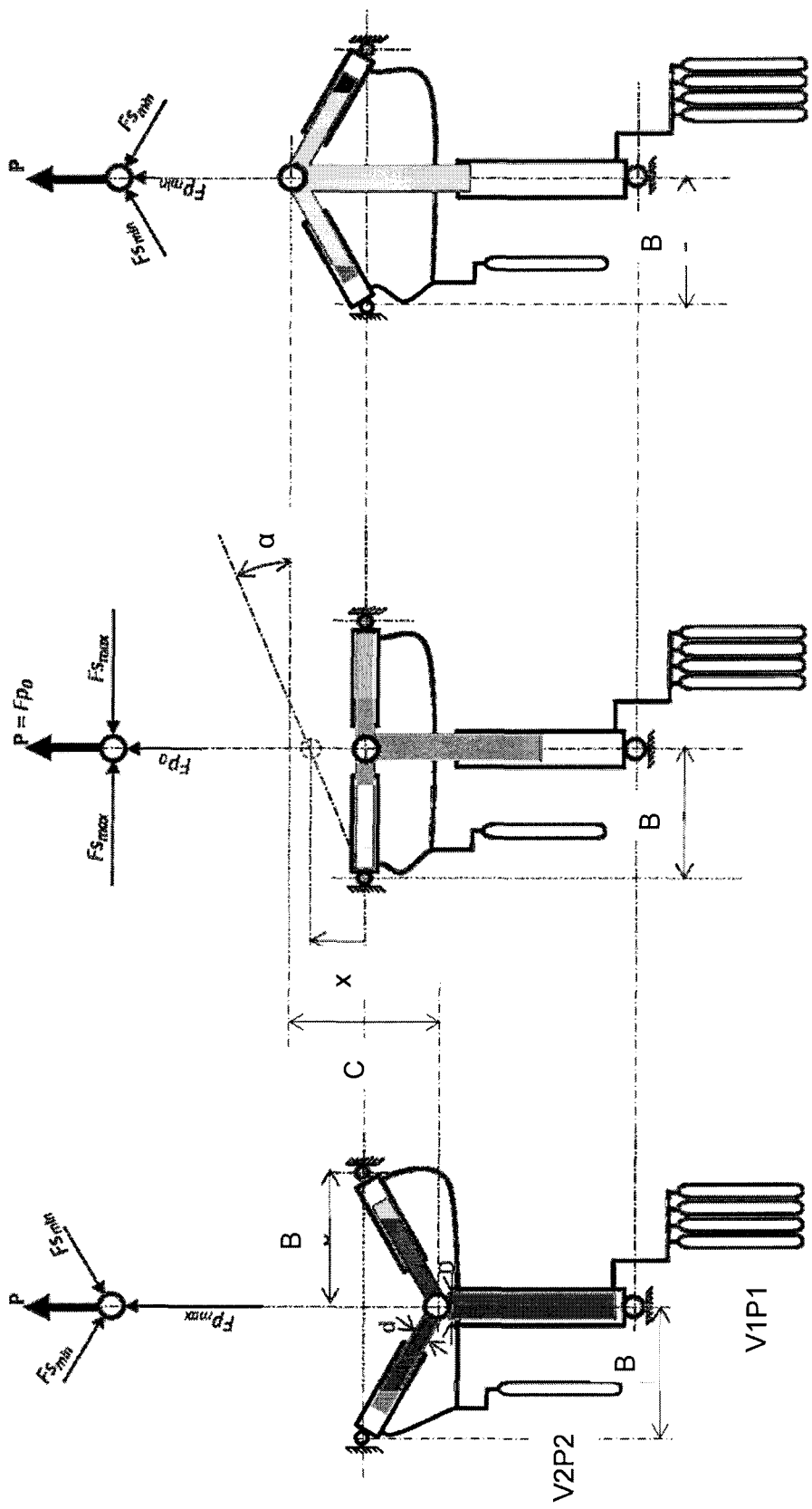
FIGS. 5a-c schematically show an isodyne compensator with hydropneumatic cylinders in three positions.

The layout of FIGS. 5a-c is obtained by replacing the springs of FIGS. 1a-d with such cylinders. The secondary or auxiliary cylinders are connected to a hydraulic circuit $P_2V_2$, the main cylinder being connected to a second circuit $P_1V_1$. Thus, the hydraulic pressure settings are independent.

The example is based on an application of the compensation of heave due to the wave motion. The table hereafter gives the main dimensions of the unit:

| P (t) | C (m) | B (m) | D (m) | N | S (m$^2$) | d (m) | n | s (m$^2$) | V1 (m$^3$) | V2 (m3) | P1 max (bars) | P2 max (bars) |
|---|---|---|---|---|---|---|---|---|---|---|---|---|
| 454 | 7.62 | 3.81 | 0.400 | 2 | 0.25132 | 0.08 | 4 | 0.02011 | 22.3 | 5.0 | 191 | 175 |

Figure 6:
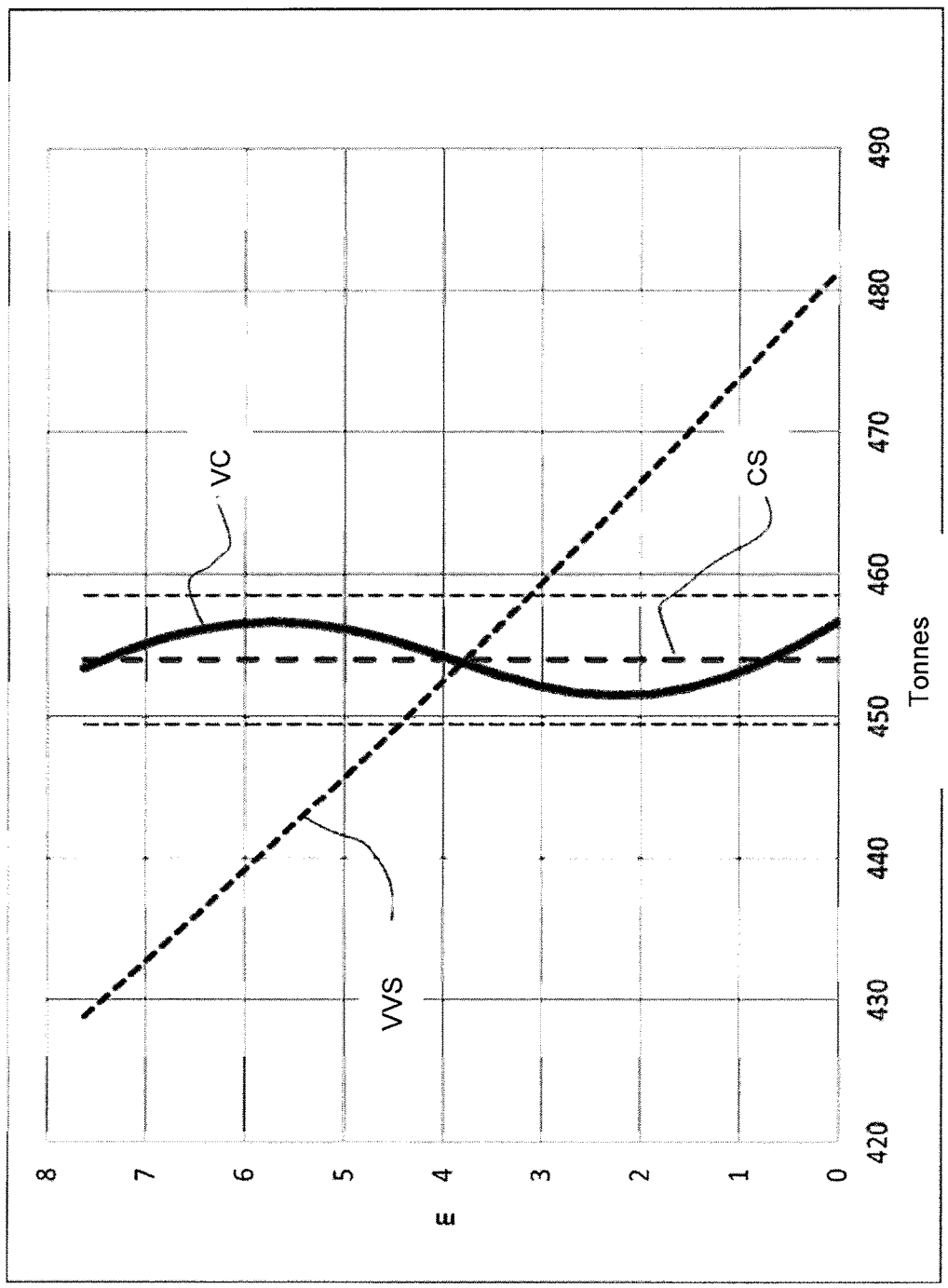
FIG. 6 shows an example of response of a hydropneumatic isodyne compensator with 3 T-shaped springs.

The maximum load is 454 tons (1 million pounds: 1000 Klbs or Kips) and the maximum stroke of 7.62 m (25 ft) corresponds to a conventional length for this type of cylinder. There are 2 main cylinders (N) and 4 secondary cylinders (n). The diagram of FIG. 6 shows the behaviour of the compensator. Curve CS represents the setpoint, curve VVS represents the response with a single main cylinder and curve VC represents the response with the compensation according to FIGS. 5*a-c*. The entire 7.62 m-long stroke C is traveled with a nearly constant lift at 454 tons, the absolute value of the maximum difference being 2.623 tons, i.e. 0.58% of setpoint value CS.

Figure 8:
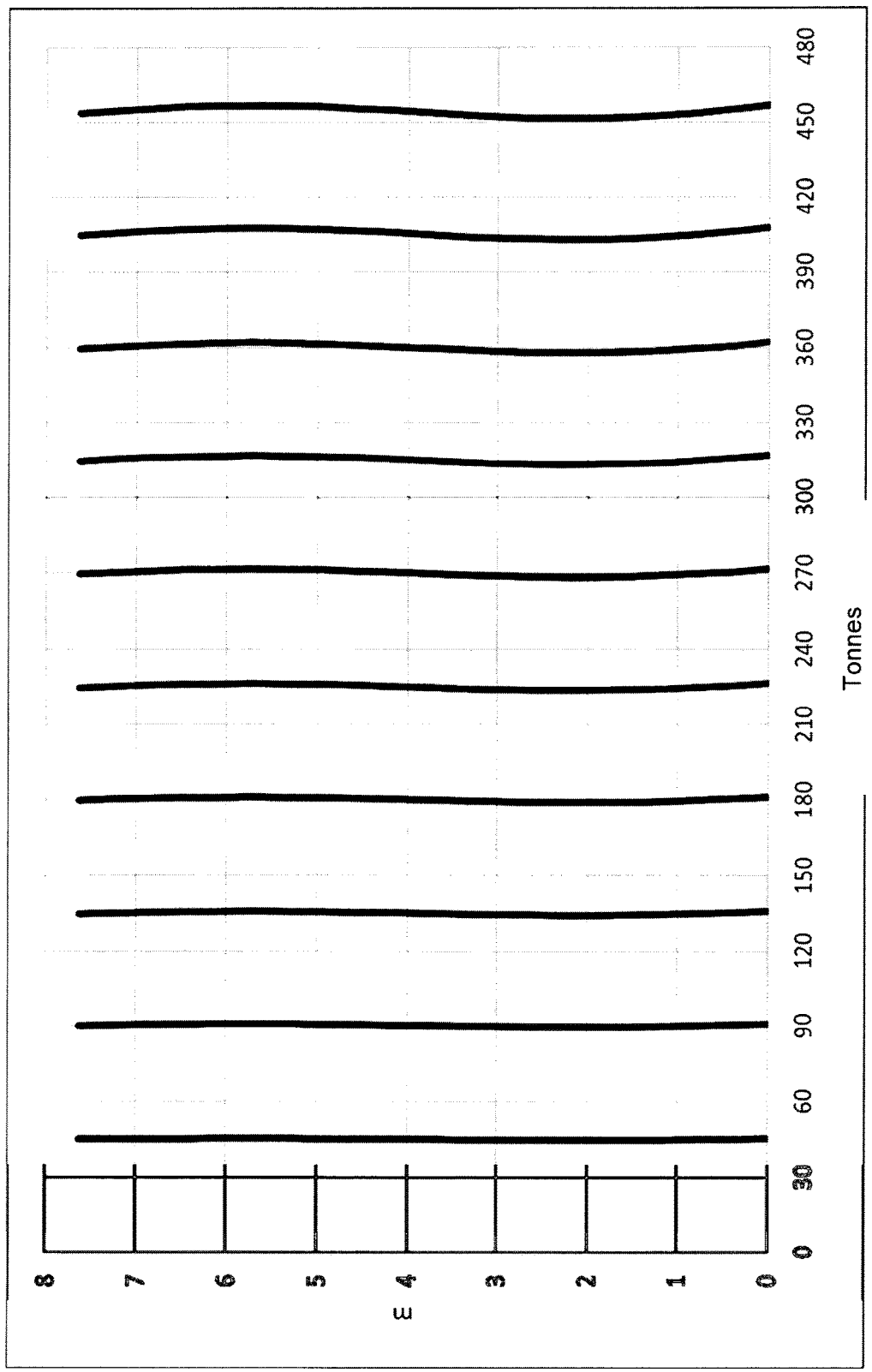
FIG. 8 shows the theoretical behaviour of a pneumatic isodyne compensator with 3 T-shaped cylinders for different load cases.

By varying the pressures of each circuit, it is possible to compensate for the heave for any case of lower load with the same equipment, as summarized in the table hereafter and the diagram of FIG. 8.

| | F tons | | | | | | | | | |
|---|---|---|---|---|---|---|---|---|---|---|
| | 45 | 90 | 135 | 180 | 225 | 270 | 315 | 360 | 405 | 454 |
| V1 m3 | 22.3 | 22.3 | 22.3 | 22.3 | 22.3 | 22.3 | 22.3 | 22.3 | 22.3 | 22.3 |
| V2 m3 | 5.0 | 5.0 | 5.0 | 5.0 | 5.0 | 5.0 | 5.0 | 5.0 | 5.0 | 5.0 |
| P1 bars | 18.98 | 38.0 | 56.9 | 75.9 | 94.9 | 113.9 | 132.9 | 151.8 | 170.8 | 191.5 |
| P2 bars | 17.31 | 34.6 | 51.9 | 69.2 | 86.5 | 103.8 | 121.1 | 138.4 | 155.7 | 174.6 |
| Max error T | 0.260 | 0.520 | 0.780 | 1.040 | 1.300 | 1.560 | 1.820 | 2.080 | 2.340 | 2.623 |
| Max error % | 0.58% | 0.58% | 0.58% | 0.58% | 0.58% | 0.58% | 0.58% | 0.58% | 0.58% | 0.58% |

Figure 7:
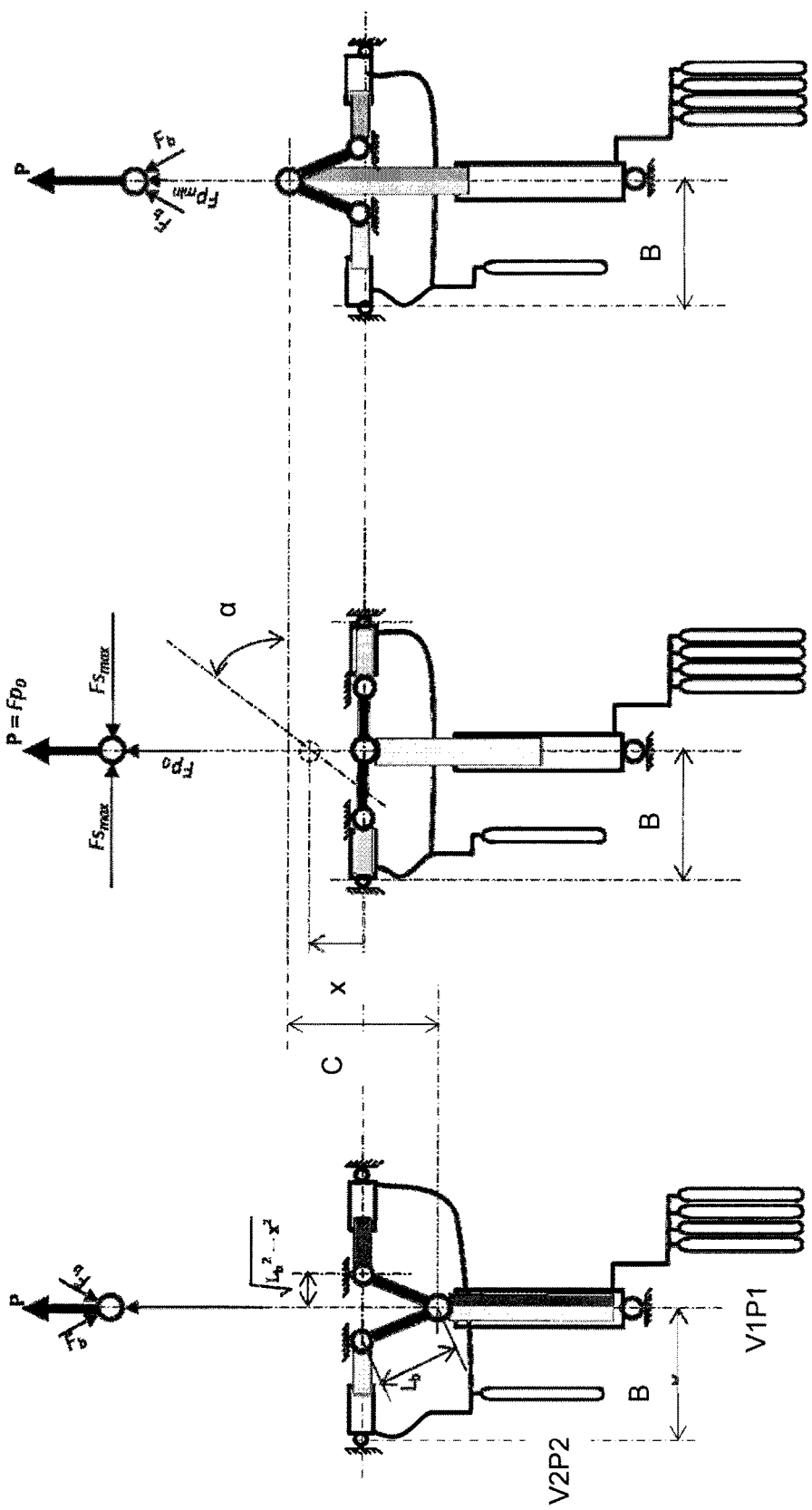
FIGS. 7a-c show an isodyne compensator with combined cylinders and connecting rods.

4: Compensator with Pneumatic or Hydropneumatic Cylinders and Connecting Rods (FIGS. 7*a-c*):

The layout of FIGS. 7*a-c* is obtained by replacing the springs of FIGS. 2*a-d* with hydropneumatic cylinders.

The load case and the stroke are identical to the previous example. The table hereafter gives the main dimensions:

| P (t) | C (m) | Lb (m) | D (m) | N | S (m$^2$) | d (m) | n | s (m$^2$) | V1 (m3) | V2 (m3) | P1$_{max}$ (bars) | P2$_{max}$ (bars) |
|---|---|---|---|---|---|---|---|---|---|---|---|---|
| 454 | 7.62 | 5.497 | 0.386 | 2 | 0.23404 | 0.10 | 4 | 0.03142 | 14.906 | 0.197 | 209.8 | 161.9 |

Figure 9:
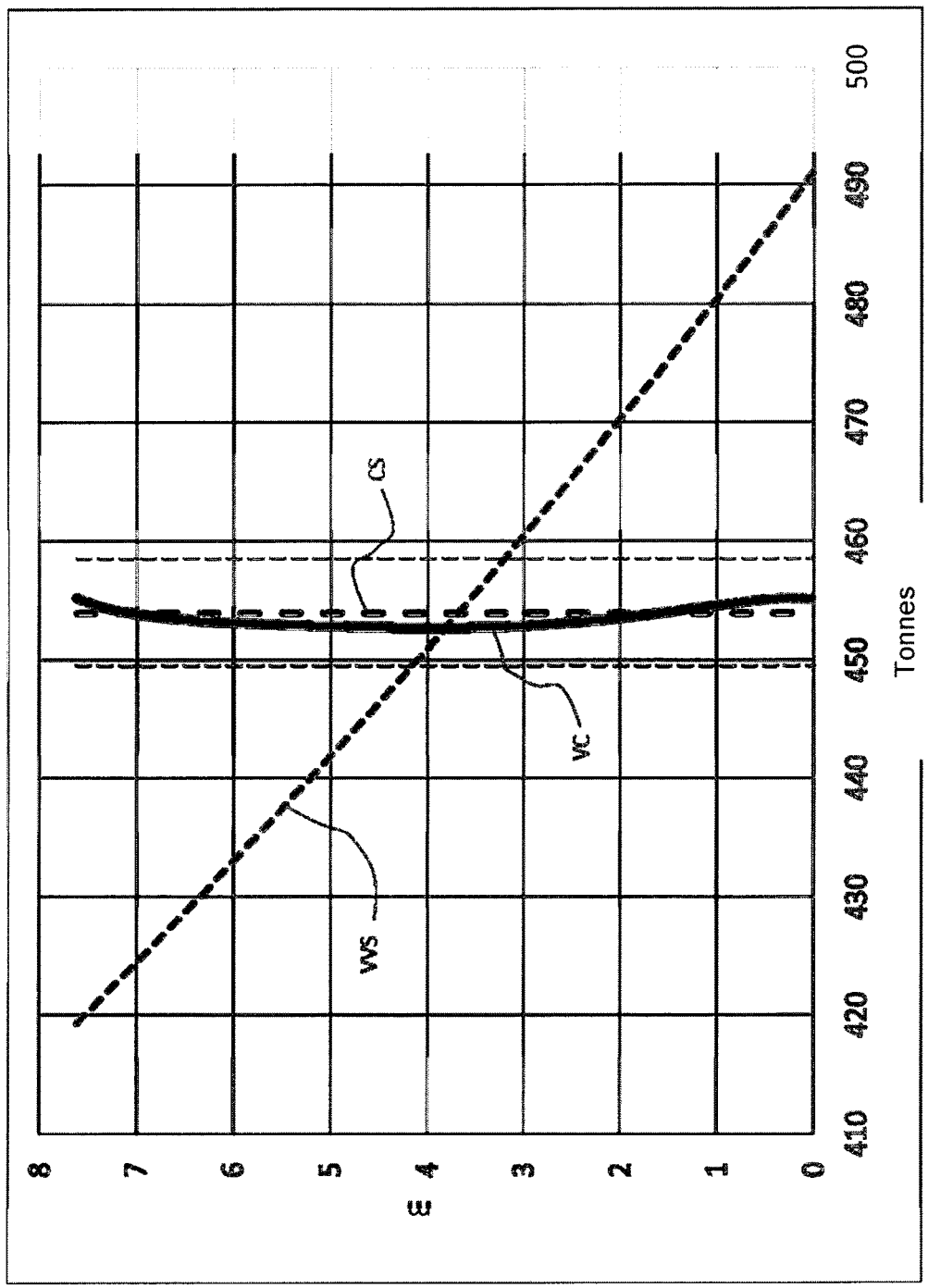
FIG. 9 shows the theoretical behaviour of a pneumatic isodyne compensator with combined cylinders and connecting rod.

The diameter of the main cylinder rods has been decreased by 4 mm and the volumes of air significantly decreased from 22.3 to 14.9 m$^3$ for V1, and from 5.0 to 0.197 m$^3$ for V2. The diagram of FIG. 9 shows the behaviour of the compensator. Curve CS represents the setpoint, curve VVS the response with a single main cylinder and curve VC the response with the compensation according to FIGS. 7*a-c*. The maximum difference is 1.272 tons, i.e. 0.28% of the setpoint value. The theoretically ideal compensation is very close but in any case it is illusory due to the non-linearity of the pneumatic response.

Figure 10:
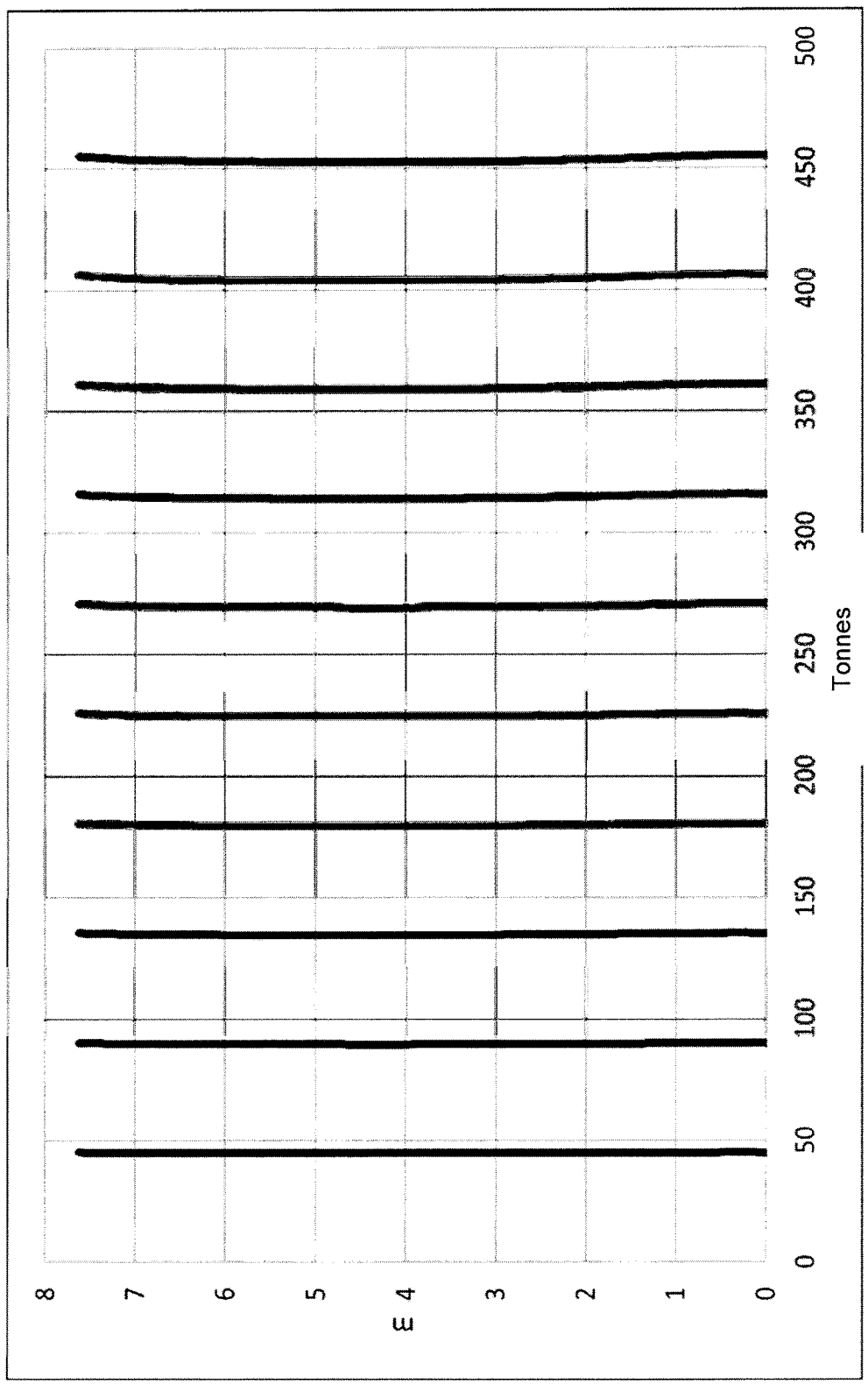
FIG. 10 shows the theoretical behaviour of a pneumatic isodyne compensator with cylinders and connecting rods for different load cases.

The summary table hereafter and the diagram of FIG. 10 are obtained by similarly scanning the load cases as in the previous example.

| | F tons | | | | | | | | | |
|---|---|---|---|---|---|---|---|---|---|---|
| | 45 | 90 | 135 | 180 | 225 | 270 | 315 | 360 | 405 | 454 |
| V1 m3 | 14.906 | 14.906 | 14.906 | 14.906 | 14.906 | 14.906 | 14.906 | 14.906 | 14.906 | 14.906 |
| V2 m3 | 0.197 | 0.197 | 0.197 | 0.197 | 0.197 | 0.197 | 0.197 | 0.197 | 0.197 | 0.197 |
| P1 bars | 20.80 | 41.6 | 62.4 | 83.2 | 104.0 | 124.8 | 145.6 | 166.4 | 187.2 | 209.8 |
| P2 bars | 16.05 | 32.1 | 48.2 | 64.2 | 80.3 | 96.3 | 112.4 | 128.4 | 144.5 | 161.9 |
| Max error T | 0.126 | 0.252 | 0.378 | 0.504 | 0.630 | 0.756 | 0.883 | 1.009 | 1.135 | 1.272 |
| Max error % | 0.28% | 0.28% | 0.28% | 0.28% | 0.28% | 0.28% | 0.28% | 0.28% | 0.28% | 0.28% |

FIGS. 11a, 11b and 11c illustrate an application of the device according to the invention to a load lifting system, for example a drilling rig supported by a floating unit. The various operations, drilling (application of a constant weight on bit), riser tension, wellhead handling, require control of the movement of load P whatever the movement of the floating support with the swell. The incorporation of the device according to the invention in the heave compensating system allows optimization of the control. FIG. 11b shows the position at mid-stroke, where the secondary cylinders connected to the crown block by rods 6, 7 do not act complementary to the main cylinders. FIG. 11a shows the position of the compensating system in upper position with the addition of the forces provided by the secondary cylinders, through the agency of the rods. FIG. 11c shows the system in lower position with the subtraction of the forces provided by the secondary cylinders, through the agency of the rods. The crown block from which substantially constant load P is suspended remains practically stationary relative to the bottom, considering the cable length conservation, by use of the cableway as in the prior art.

It can be seen in FIG. 11 a that each main and secondary cylinder system has independent static pressure control means (P2V2 and P1V1).

Of course, as described above, the use of connecting rods is not systematic but it greatly facilitates the incorporation of a system according to the invention in a conventional compensator, for example the one described in U.S. Pat. No. 5,520,369.

5: Compensator with Pneumatic or Hydropneumatic Cylinders and Connecting Rods (FIGS. 15a-e):

Application of this fourth solution to conventional offshore drilling vessels or platforms, that is having a rope winch and hydropneumatic cylinders acting upon the crown block at the masthead, can be performed quite simply. Indeed, the articulated bar system of the heave compensator is already used to keep the cable length throughout the stroke, for example in a conventional heave compensator, notably as described in document U.S. Pat. No. 5,520,369. FIGS. 15a to 15e show the principle of such an embodiment for a 25-ft long stroke (7.62 m) (only the hydropneumatic circuits are not to scale, FIGS. 15a to 15e showing half a heave compensator with the other half being deductible by symmetry). FIGS. 15a to 15e illustrate the movement of the main 1 and secondary 2 cylinders over the entire stroke C of the upper block of the heave compensator.

Calculation of the lift of such a system is similar to the calculation with mechanical springs detailed above, stiffnesses $K_p$ and $K_s$ being replaced by their pneumatic equivalents calculated at each point by use of the "polytropic" formula $P \cdot V^\gamma = $ constant.

Figure 16:
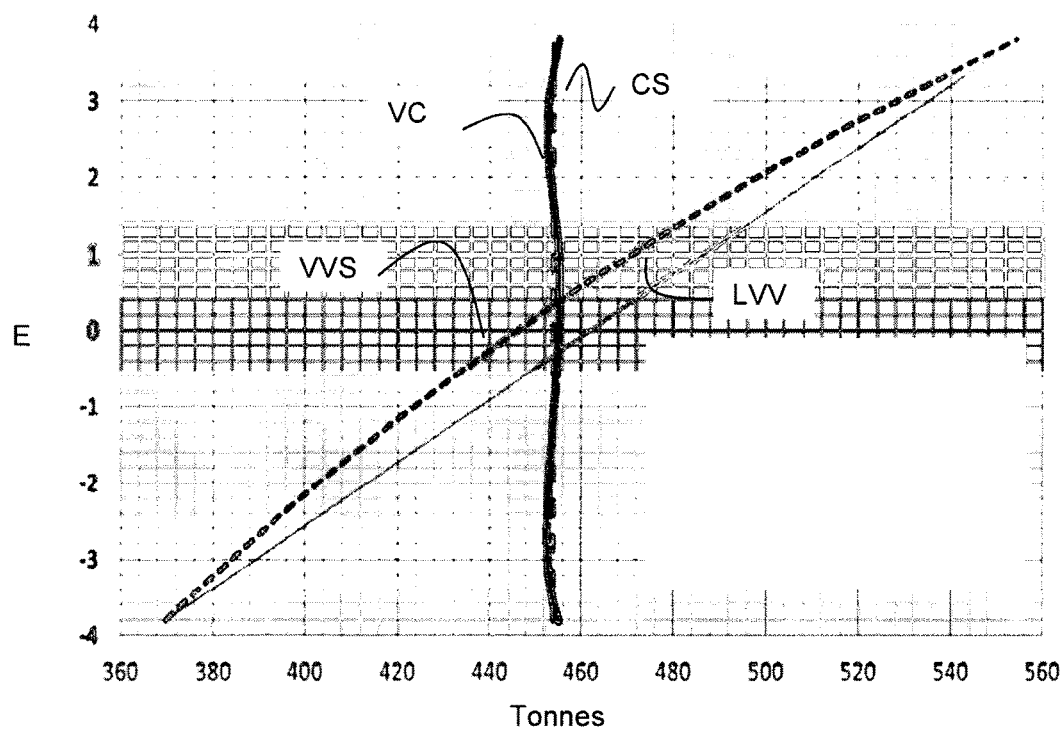
FIG. 16 shows the theoretical behaviour of an isodyne compensator with an articulated system comprising two connecting rods according to the variant embodiment of FIGS. 13a to 13d.

An optimization bearing upon the conventional case of 454 tons×7.62 m (1000 Kpounds×25 ft) leads to the theoretical result detailed in Table 1 and the diagram of FIG. 16.

Figure 15:
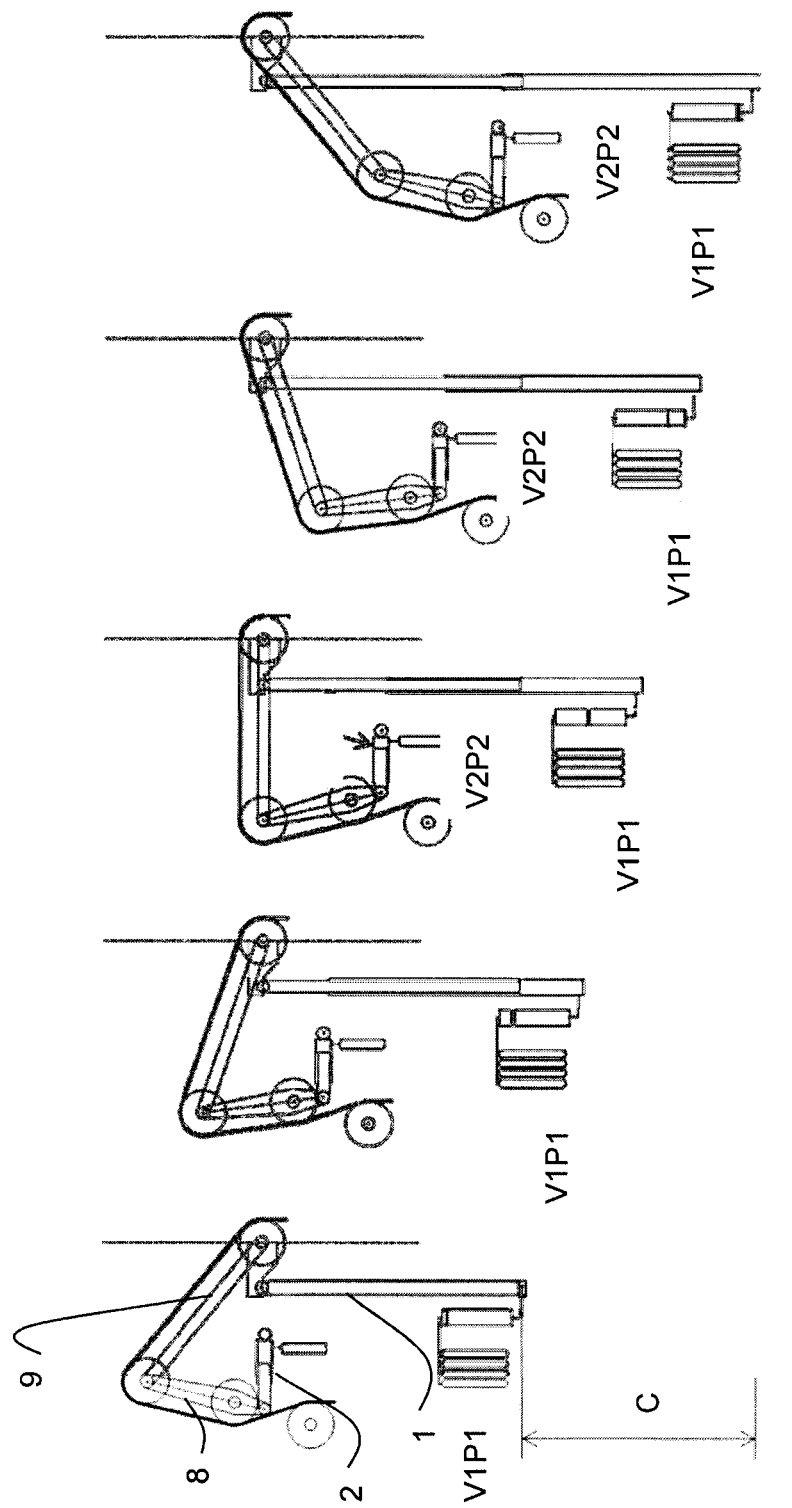
FIGS. 15a to 15e show a heave compensator comprising an "isodyne" compensator according to the variant embodiment of FIGS. 13a to 13d.

The notations of FIGS. 14 and 15 are and D is the diameter of the main cylinder rods, NVP is the number of main cylinders, SP is the total section of the main cylinders, d is the diameter of the auxiliary cylinder rods, NVA is the number of auxiliary cylinders, SA is the total section of the auxiliary cylinders, NP is the number of sheaves of the traveling block and TC is the cable tension.

The diagram of FIG. 16 shows the behaviour of the compensator. Curve CS in dotted line shows the setpoint, curve VVS the response with only the vertical main cylinders (V1), curve LVV the linear (theoretical) response of the vertical main cylinders and curve VC in solid line the response with the compensation according to FIGS. 15a-e.

The maximum absolute deviation from the suspended weight setpoint is 1.384 ton, i.e. 0.305% of the load. The device is thus efficient in comparison to the prior art where the best results are on the order of 2% or more.

The main advantage of the device according to this embodiment also lies in the reduction of the total volume of high pressure air that is required. The best prior embodiments require 15 to 20 m³ air under high pressure (210 bars), whereas the present example merely requires 6 m³ main volume (V1) and 400 liters for the auxiliary circuit (V2), with pressures of the same order.

Furthermore, it can be noted that the lift of the main cylinders only at mid-stroke is slightly below the setpoint value. In practice, the connecting rods BC are not horizontal at the exact midpoint. The adjustment of maximum pressure P1, performed at zero travel of the main cylinders, is not impacted thereby. On the other hand, the maximum of pressure P2 obtained by placing rods BC horizontally is slightly above the mid-stroke value (approximately 0.5 bar here), considered maximal for starting the optimization. This detail needs to be taken into account in the sizing.

Applications

1. As mentioned for the various examples illustrated above, the system for controlling the relative movement of a load (according to any one of the variant embodiments of the invention described above), also referred to as "isodyne" compensator, can be integrated in a heave compensation system used on a floating structure. For example, the isodyne compensator can be integrated in a conventional compensator as described in document U.S. Pat. No. 5,520,369. Two examples of integration in a heave compensator are illustrated in FIGS. 11a-11c and 15a-15e. Using an isodyne compensator according to the invention in a heave compensator enables optimization of the passive load movement control.

For a heave compensator, the frame corresponds to the floating unit. For this application, the main damper can be at least one and preferably at least two steering cylinders substantially parallel to the direction of the load (essentially

TABLE 1

| Data of Example 5 | | | | | | | | | | | |
|---|---|---|---|---|---|---|---|---|---|---|---|
| $F_0$ (t) | s (m) | l (m) | m (m) | n (m) | e (m) | g (m) | D (m) | y (m) | z (m) | β (°) | AP (m) |
| 454 | 7.62 | 5.60 | 2.50 | 1.005 | 3.931 | 1.563 | 0.41 | 2.2 | 0.9 | 22.2 | 2.38 |

| NVP | SP (m²) | d (m) | NVA | SA (m²) | V1 (m³) | V2 (m³) | P1 max (bars) | P2 max (bars) | γ air | NP | TC (t) |
|---|---|---|---|---|---|---|---|---|---|---|---|
| 2 | 0.264 | 0.235 | 4 | 0.173 | 6 | 0.4 | 209.9 | 195.3 | 1.4 | 7 | 32.4 | vertical). Furthermore, in the heave compensator, the main and secondary damper can comprise hydraulic cylinders. Moreover, the main and secondary damper can comprise independent hydropneumatic systems for adjusting the hydraulic pressure thereof independently.

2. The movement control system according to the invention (isodyne compensator) can also be applied to an isobaric pressure compensator. Indeed, any undeformable enclosure (housing, drum, pipe, circuit, etc.) containing one or more fluids likely to undergo volume variations (thermal expansion or shrinkage, chemical reaction, etc.) needs to be protected against induced pressure variations, which are all the greater as the fluid is barely compressible.

This protection is mostly n communication of the enclosure with a gas volume, significantly more compressible than the fluid considered and generally isolated therefrom by a membrane or a piston, and thus in limiting the amplitude of the pressure variation to contain the pressure within the limits allowable by the enclosure. The device, known as pressure accumulator, is limited by the gas volume, which itself makes up a second enclosure subjected to the same stresses as the main enclosure, and by the fact that this volume needs to be all the greater as the pressure variation amplitude is to be limited. A well-designed pressure accumulator is protective against the destruction of the enclosure and it enables the fluid to be kept within, but the size thereof and the pressure-related regulatory requirements (periodic inspections) limit the use thereof, notably to the case of expensive or hazardous fluids. However, this protection is not absolute in case of uncontrollable expansion (chemical reaction runaway, fire, etc.).

Another type of protection generally is used for opening the enclosure onto the outside through a burst disc or a valve as soon as the pressure limit is reached. Such an equipment is an absolute protection against destruction of the enclosure, but the discharged fluid is lost, and generally the function fulfilled by the enclosure needs at least to be restarted (case of a chemical reactor). This type of protection is therefore preferably used for cheap fluids (water, air, etc.) and for cases where temporary stoppage prior to restart is not too much of a penalty.

Figure 17:
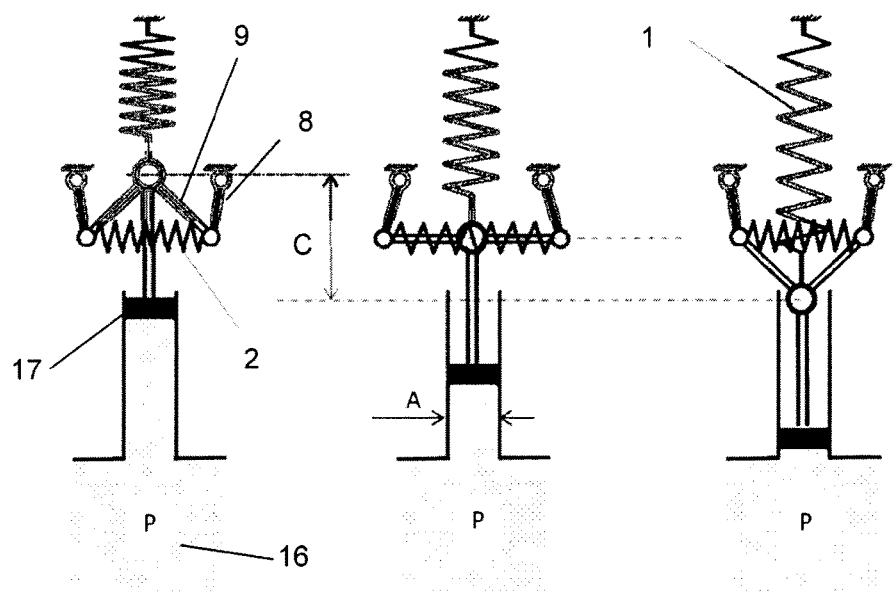
FIG. 17 shows an isobaric compensator comprising an isodyne compensator according to the invention.

Application of the invention to the protection of enclosures containing one or more fluids likely to undergo volume variations can be achieved quite simply according to the diagram of FIG. 17. A cylinder of section A is connected to an enclosure 16 filled with a fluid at a pressure P. A sealed piston 17 sliding in the cylinder over a length separates the fluid within the enclosure from the outside. An isodyne compensator according to the invention connects the piston 17 to a fixed frame with respect to enclosure 16. The isodyne compensator can be formed according to the third solution illustrated in FIGS. 12a-d, that is with a main spring 1, a secondary spring 2, secondary spring 2 being linked to main spring 1 by an articulated system comprising two connecting rods 8 and 9. Thus, the force exerted on the piston by the isodyne compensator is nearly constant with the pressure P prevailing inside the enclosure is only very slightly affected by the volume variations of the inner fluid causing the piston to move in one direction or the other. Such a compensator can also be equipped with a piston position sensor allowing detection of any volume variation of the inner fluid. Such a detection allows for example, without any pressure conditions change better control of the evolution of a chemical reaction within the enclosure, or to identify a fluid loss or gain at very low flow rate.

Finally, the device can also be used as a pulsation dampener, for example for a piston pump, or as a temporary mechanical energy accumulator. For the latter use, the stored energy is the product of the piston displacement by the constant force delivered by the equipment. The advantage is to have the same force throughout the piston stroke, which allows for example to actuate a hydraulic motor with an oil pressure independent of the "filling" level of the accumulator. Likewise, if the same hydraulic motor (reversible) is used as a pump, filling also occurs at constant pressure. The equipment optimized for a single pressure thus has a maximum efficiency over the entire range of use, and the instantaneous power, whether storage or draw-off, theoretically depends only on the possible oil flow rate. A possible application is the recovery of the brake energy from a vehicle where the available instantaneous power capacity is higher than the total amount of energy itself.

3. The load movement control system according to the invention (the "isodyne" compensator) can further be used in a vehicle suspension system. Indeed, a mass M suspended from a support by a deformable link (suspension) reacts to the pulses or oscillations of the support according to two main characteristics of the suspension: stiffness K that determines the force exerted as a function of the deformation amplitude, and damping coefficient C that determines an additional force depending on the deformation rate.

M and K define the eigenfrequency, or resonant frequency, of the system, which is written:

$$f = \frac{1}{\ln}\sqrt{\frac{K}{M}}.$$

The essential function of a suspension is to filter the oscillations of the support. A minimum value is selected for K so that the eigenfrequency is as low as possible in relation to the frequencies expected for the oscillations. However, K has to be sufficient to prevent the suspension from reaching its stop, for example in case of high additional dynamic forces. Since it is generally not possible to modify K (coil spring, rubber block, etc.), the selected value is a compromise between conflicting constraints, and adapting most of the suspensions to the various support stress conditions (frequency, dynamic effects, etc.) is achieved only by varying the damping coefficient, which is relatively easy to modulate using hydraulic circuits where a fluid is forced through orifices of variable sections.

Figure 18:
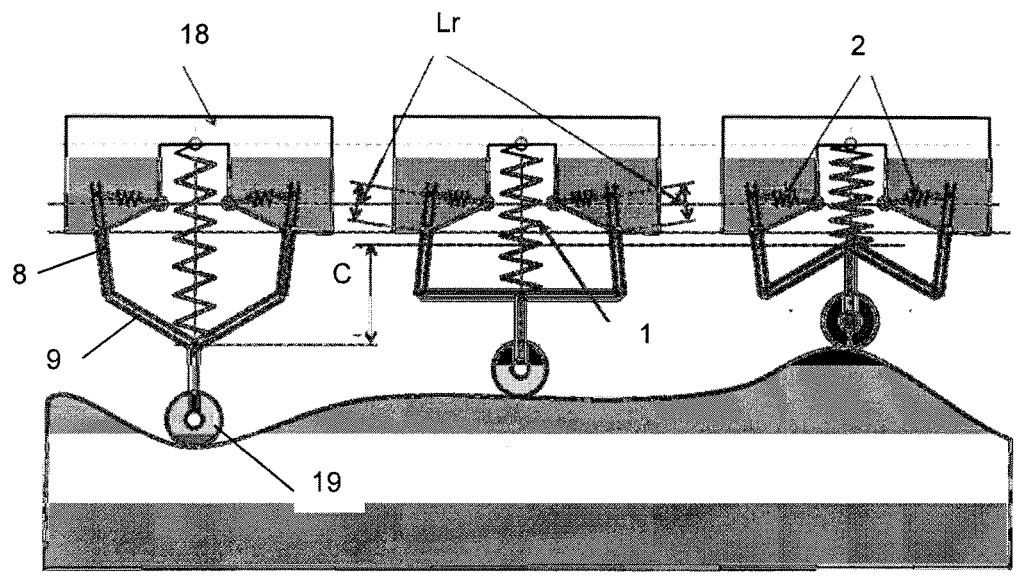
FIG. 18 shows a suspension system comprising an isodyne compensator according to the invention.

The principle of the invention allows continuous adjustment of the desired stiffness easily over the entire stroke (travel) of a suspension. FIG. 18 illustrates a vehicle suspension comprising an isodyne compensator according to the fourth solution illustrated in FIGS. 13a-13d. The isodyne compensator is arranged between wheel 19 and the frame of vehicle 18, for example the chassis of the vehicle. As FIG. 19 indicates, it is possible to modulate the compression of connecting rod 9, and therefore the overall elastic response of the suspension, simply by varying the length of the lever of rod 8 from a zero value (no compensation) to a maximum value (isodyne compensation). An equivalent result can be obtained by modifying the lever arm and/or the stroke and therefore the range of possible forces of secondary spring 2, for example by adjustment of length Lr of rod 8.

Figure 19:
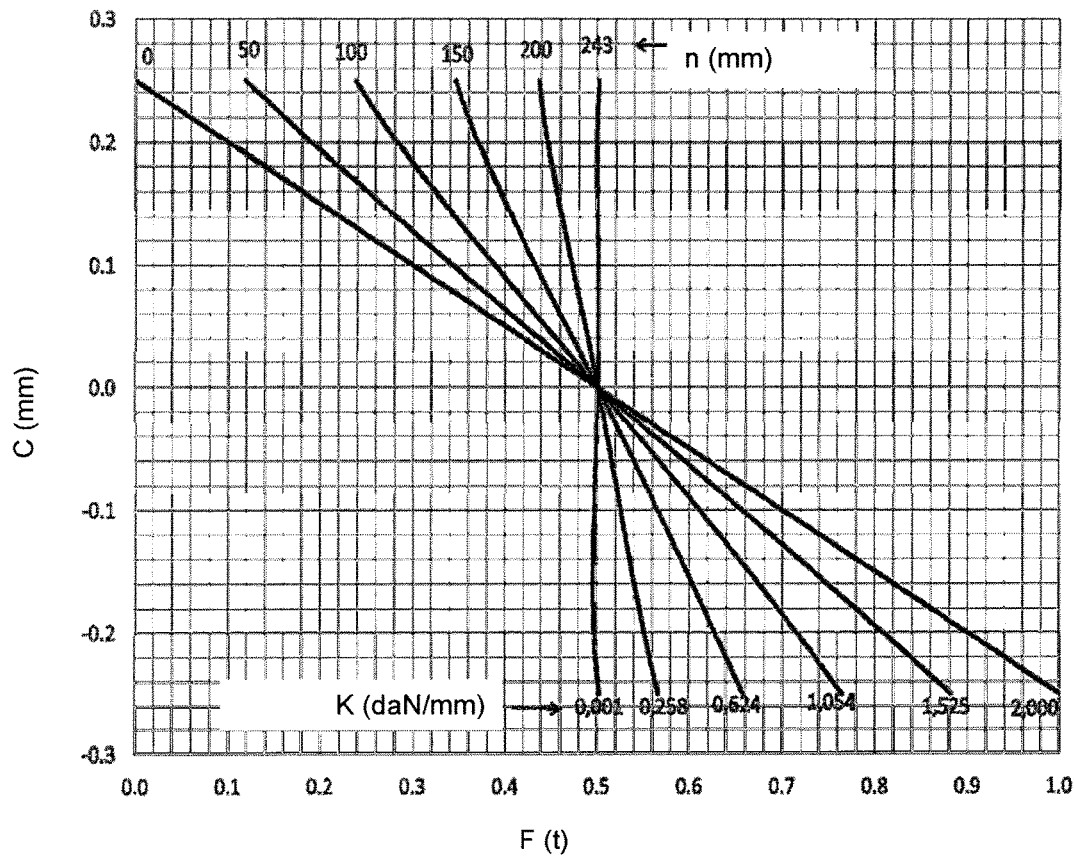
FIG. 19 shows curves, for different stiffnesses, of the stroke as a function of lift for a suspension equipped with an "isodyne" compensator.

FIG. 19 illustrates curves showing the variation of stroke C as a function of lift F in tons, for different thicknesses K. A lever length value n is associated with each stiffness K as shown in FIG. 14. These curves correspond to a 0.5-ton suspended mass and to a 500-mm travel. According to this example, the stiffness of such a device can be set between 2 daN/mm (main spring alone) and 0.001 daN/mm, that is approximately 1 gram/mm (isodyne suspension). It can be noted that only the curve corresponding to the maximum stiffness is a straight line. The slight distortion of the other curves is due to the geometry of the articulated bar system that cannot approach the balance of the initial solution with transverse guides for the connecting rod small ends.

Other adjustments are possible, notably the distance between pivot A and the main spring stroke minimum. The effect is then on the lift value around which the stiffness can be varied. It is possible, up to a certain limit, to adapt the suspension to a variation of ±30% of the median value.

The invention claimed is:

1. A system for controlling relative movement of a load comprising:
    at least one main damper for damping longitudinal movement of the load in a stroke, the at least one main damper having ends with one end connected to a frame and another end connected to the load;
    a compensation device including at least one secondary damper of the longitudinal movement having ends with one end connected to the frame and another end connected to an end of the at least one main damper which is connected to the load; and wherein
    at one point of the longitudinal movement of the load in the stroke, the at least one secondary damper moves in a direction orthogonal to the direction of the longitudinal movement, is connected to the load by an articulated system which includes means for guiding movement of the at least one secondary damper in a fixed direction relative to the direction of longitudinal movement of the at least one main damper.

2. A system as claimed in claim 1, wherein:
    the at least one damper of longitudinal action is one of a spring cylinder, a hydraulic cylinder and a pneumatic cylinder, or a combination thereof.

3. A system as claimed in claim 2, wherein the stroke is at most equal to length of a rod of the cylinder.

4. A system as claimed in claim 3, wherein at least two secondary dampers are symmetrical to an axis of the at least one main damper to cancel actions of the at least two secondary dampers orthogonal to an axis of movement of at least one main damper.

5. A system as claimed in claim 3, wherein the point of the stroke is in a middle part of the stroke.

6. A system as claimed in claim 2, wherein at least two secondary dampers are symmetrical to an axis of the at least one main damper to cancel movement of the at least two secondary dampers orthogonal to an axis of movement of at least one main damper.

7. A system as claimed in claim 2, wherein the point of the stroke is in a middle part of the stroke.

8. A system as claimed in claim 1, wherein at least two secondary dampers are symmetrical to an axis of the at least one main damper to cancel movement of the at least two secondary dampers orthogonal to an axis of movement of at least one main damper.

9. A system as claimed in claim 8, wherein the point of the stroke is in a middle part of the stroke.

10. A system as claimed in claim 1, wherein the point of the stroke is in a middle part of the stroke.

11. A system as claimed in claim 1, wherein the articulated system comprises a connecting rod.

12. A system as claimed in claim 1, wherein the articulated system comprises a first connecting rod with one end fastened to an end of the at least one main damper connected to the load, and a second connecting rod comprising a first end articulated with to a second end of first connecting rod and a second end articulated to the frame with the articulation between the first connecting rod and the second connecting rod being fastened to an end of a secondary damper connected to main damper.

13. A system as claimed in claim 1, wherein the articulated system comprises a first connecting rod with one end fastened to an end of the at least one main damper connected to the load, and a second connecting rod comprising a first end articulated with to a second end of first connecting rod and a second end articulated to the frame with the articulation between the first connecting rod and the second connecting rod being fastened to an end of a secondary damper connected to main damper.

14. A floating support heave compensator, comprising a load movement control system as claimed in claim 1.

15. A compensator as claimed in claim 14, wherein the at least one main damper each includes at least two steering cylinders parallel to a direction of movement of the load.

16. A compensator as claimed in claim 15, wherein the at least one main damper and the at least one secondary damper each comprise hydraulic cylinders.

17. A compensator as claimed in claim 14, wherein the at least one main damper and the at least one secondary damper comprise hydraulic cylinders.

18. A compensator as claimed in claim 17, wherein the at least one main and the at least one secondary dampers each comprise an independent hydropneumatic system for independently adjusting hydraulic pressure.

19. An isobaric expansion compensator for an enclosure comprising a volume of fluid, the compensator comprising a piston in a cylinder of the enclosure, wherein the piston is connected to the frame by a system as claimed in claim 1.

20. A suspension for a land vehicle comprising at least one system as claimed in claim 1 connecting a wheel of the vehicle to frame of the vehicle, comprising a means for adjusting stiffness of movement of a control system.

21. A system as claimed in claim 1, wherein the guided movement of the at least one secondary damper in a fixed direction orthogonal to the direction of movement of the load and the at least one main damper.

* * * * *